US010412685B2

United States Patent
Scipione et al.

(10) Patent No.: US 10,412,685 B2
(45) Date of Patent: Sep. 10, 2019

(54) DUTY CYCLE-BASED POWER CONTROL SCHEME FOR SATELLITE COMMUNICATION

(71) Applicant: QUALCOMM Incorporated, San Diego, CA (US)

(72) Inventors: Mario Mark Scipione, Del Mar, CA (US); Gene Wesley Marsh, Encinitas, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/146,560

(22) Filed: May 4, 2016

(65) Prior Publication Data

US 2017/0078978 A1    Mar. 16, 2017

Related U.S. Application Data

(60) Provisional application No. 62/219,111, filed on Sep. 15, 2015.

(51) Int. Cl.
*H04W 52/02* (2009.01)
*H04B 7/185* (2006.01)
(Continued)

(52) U.S. Cl.
CPC ........ *H04W 52/18* (2013.01); *H04B 7/18543* (2013.01); *H04W 72/0446* (2013.01); *H04W 84/06* (2013.01)

(58) Field of Classification Search
CPC ......... H04W 52/0216; H04W 52/0258; H04W 52/02; H04W 52/18
See application file for complete search history.

(56) References Cited

U.S. PATENT DOCUMENTS 5,027,124 A * 6/1991 Fitzsimmons ....... H01Q 21/245
                                                        342/362
5,721,534 A * 2/1998 Olds .................. H04B 7/18567
                                                        340/2.1
(Continued)

FOREIGN PATENT DOCUMENTS

WO    WO-2014108719 A1    7/2014

OTHER PUBLICATIONS

Bailey H, et.al., "Behavioural Estimation of Blue Whale Movements in the Northeast Pacific from State-Space Model Analysis of Satellite Tracks", Endangered Species Research, vol. 10, Nov. 30, 2009 (Nov. 30, 2009), XP955323568, pp. 93-106.

(Continued)

*Primary Examiner* — Dong-Chang Shiue
(74) *Attorney, Agent, or Firm* — Loza & Loza LLP

(57) ABSTRACT

Various aspects of the disclosure relate to controlling the transmit power of a satellite by controlling a duty cycle associated with satellite transmission. In some implementations, a satellite network portal (SNP) may send waveforms to a satellite that relays the waveforms to user terminals (UTs). The SNP may control the duty cycle of the waveform transmission (e.g., by transmitting on a subset of a subframe) to thereby control an average transmission power of the satellite when the satellite transmits to the UTs. In some implementations, a satellite or UT may control the duty cycle of transmission by the satellite (e.g., by transmitting on a subset of a subframe) to thereby control an average transmission power of the satellite when the satellite transmits.

53 Claims, 16 Drawing Sheets

(51) Int. Cl.
*H04W 52/18* (2009.01)
*H04W 72/04* (2009.01)
*H04W 84/06* (2009.01)

(56) References Cited

U.S. PATENT DOCUMENTS

| | | | |
|---|---|---|---|
| 5,787,336 A | 7/1998 | Hirschfield et al. | |
| 5,924,015 A | 7/1999 | Garrison et al. | |
| 5,978,363 A * | 11/1999 | Dimitrijevic | H04B 7/18539 370/319 |
| 7,925,167 B1 * | 4/2011 | Kozubal | H04B 7/18513 398/118 |
| 8,134,502 B2 | 3/2012 | Lennen | |
| 8,155,640 B1 * | 4/2012 | Battista | H04B 7/18539 370/321 |
| 8,391,781 B2 | 3/2013 | Hausman | |
| 8,554,135 B2 | 10/2013 | Branch | |
| 2001/0045494 A1 * | 11/2001 | Higgins | B64G 1/1007 244/158.4 |
| 2008/0018496 A1 * | 1/2008 | Tanner | G01S 5/0027 340/992 |
| 2010/0195499 A1 * | 8/2010 | Dattagupta | H04N 21/2381 370/235 |
| 2012/0184208 A1 * | 7/2012 | Renouard | H04B 7/18521 455/12.1 |

OTHER PUBLICATIONS

International Search Report and Written Opinion—PCT/US2016/051096—ISA/EPO—dated Dec. 12, 2016.

\* cited by examiner

DUTY CYCLE-BASED POWER CONTROL SCHEME FOR SATELLITE COMMUNICATION

CROSS-REFERENCE TO RELATED APPLICATION(S)

This application claims priority to and the benefit of provisional patent application No. 62/219,111 filed in the U.S. Patent and Trademark Office on Sep. 15, 2015, the entire content of which is incorporated herein by reference.

INTRODUCTION

Various aspects described herein relate to satellite communication and, more particularly but not exclusively, to power control for satellite communication.

Conventional satellite-based communication systems include gateways and one or more satellites to relay communication signals between the gateways and one or more user terminals (UTs). A gateway is an earth station having an antenna for transmitting signals to, and receiving signals from, communication satellites. A gateway provides communication links, using satellites, for connecting a UT to other UTs or users of other communication systems, such as a public switched telephone network, the Internet and various public and/or private networks. A satellite is an orbiting receiver and repeater used to relay information.

A satellite can receive signals from and transmit signals to a UT provided the UT is within the "footprint" of the satellite. The footprint of a satellite is the geographic region on the surface of the earth within the range of signals of the satellite. The footprint is usually geographically divided into "beams," through the use of antennas (e.g., the antennas may be used to create fixed, static beams or may be used to create dynamically adjustable beams through beam-forming techniques). Each beam covers a particular geographic region within the footprint. Beams may be directed so that more than one beam from the same satellite covers the same specific geographic region. In addition, beams from multiple satellites may be directed to cover the same geographic region.

Geosynchronous satellites have long been used for communication. A geosynchronous satellite is stationary relative to a given location on the earth. However, because geosynchronous satellites are limited to a geosynchronous orbit (GSO), which is a circle having a radius of approximately 42,164 km from the center of the earth directly above the earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire earth or at least large parts of the earth. In non-geosynchronous satellite-based systems, such as LEO satellite-based systems, the satellites move relative to a communication device (such as a gateway or a UT) on the ground.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: receive a duty cycle schedule for satellite transmission; and transmit signals according to the duty cycle schedule.

Another aspect of the disclosure provides a method for communication including: receiving a duty cycle schedule for satellite transmission; and transmitting signals according to the duty cycle schedule.

Another aspect of the disclosure provides an apparatus configured for communication. The apparatus including: means for receiving a duty cycle schedule for satellite transmission; and means for transmitting signals according to the duty cycle schedule.

Another aspect of the disclosure provides a non-transitory computer-readable medium storing computer-executable code, including code to: receive a duty cycle schedule for satellite transmission; and transmit signals according to the duty cycle schedule.

In one aspect, the disclosure provides another apparatus configured for communication that includes a memory and a processor coupled to the memory. The processor and the memory are configured to: determine, for each of a plurality of areas, at least one limit for power radiated onto the area; determine power that would be radiated onto each of the areas by a plurality of satellites; determine a duty cycle schedule for satellite transmission based on the at least one limit for each of the areas and the determined power for each of the areas; and transmit signals according to the duty cycle schedule.

Another aspect of the disclosure provides a method for communication including: determining, for each of a plurality of areas, at least one limit for power radiated onto the area; determining power that would be radiated onto each of the areas by a plurality of satellites; determining a duty cycle schedule for satellite transmission based on the at least one limit for each of the areas and the determined power for each of the areas; and transmitting signals according to the duty cycle schedule.

Another aspect of the disclosure provides an apparatus configured for communication. The apparatus including: means for determining, for each of a plurality of areas, at least one limit for power radiated onto the area; means for determining power that would be radiated onto each of the areas by a plurality of satellites; means for determining a duty cycle schedule for satellite transmission based on the at least one limit for each of the areas and the determined power for each of the areas; and means for transmitting signals according to the duty cycle schedule.

Another aspect of the disclosure provides a non-transitory computer-readable medium storing computer-executable code, including code to: determine, for each of a plurality of areas, at least one limit for power radiated onto the area; determine power that would be radiated onto each of the areas by a plurality of satellites; determine a duty cycle schedule for satellite transmission based on the at least one limit for each of the areas and the determined power for each of the areas; and transmit signals according to the duty cycle schedule.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

The disclosure relates in some aspects to controlling the transmit power of satellites by controlling a duty cycle associated with satellite transmission. In this way, the equivalent power flux density (EPFD) received on the earth's surface due to satellite transmission can be maintained within regulatory and/or operationally-imposed limits. In some aspects, the average power transmitted by a satellite can be controlled by specifying the duty cycle over which radio frequency (RF) components of the satellite antenna operate. For example, a satellite transmission scheme may employ explicit temporal boundaries, such as frames and subframes. Transmission of an entire subframe could correspond to an average power level P. In accordance with the teachings herein, reducing the average power by 10% could be accomplished by transmitting in only 90% of the subframe. Reducing the average power by 50% could be accomplished by transmitting in only 50% of the subframe, and so on. Similar results may be achieved by transmitting in only a subset of the frames, subframes, or some other defined temporal boundary (e.g., unit of time). In contrast to controlling average power by adjusting the set point of an amplifier, the disclosed techniques potentially provide greater resolution for controlling average transmission power. These techniques may be applied independently of other power control methods (e.g., controlling an amplifier set point), or may be used in conjunction with these other methods of power control. In view of the above, in some aspects, the disclosure relates to a low power scheme for satellite communication.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
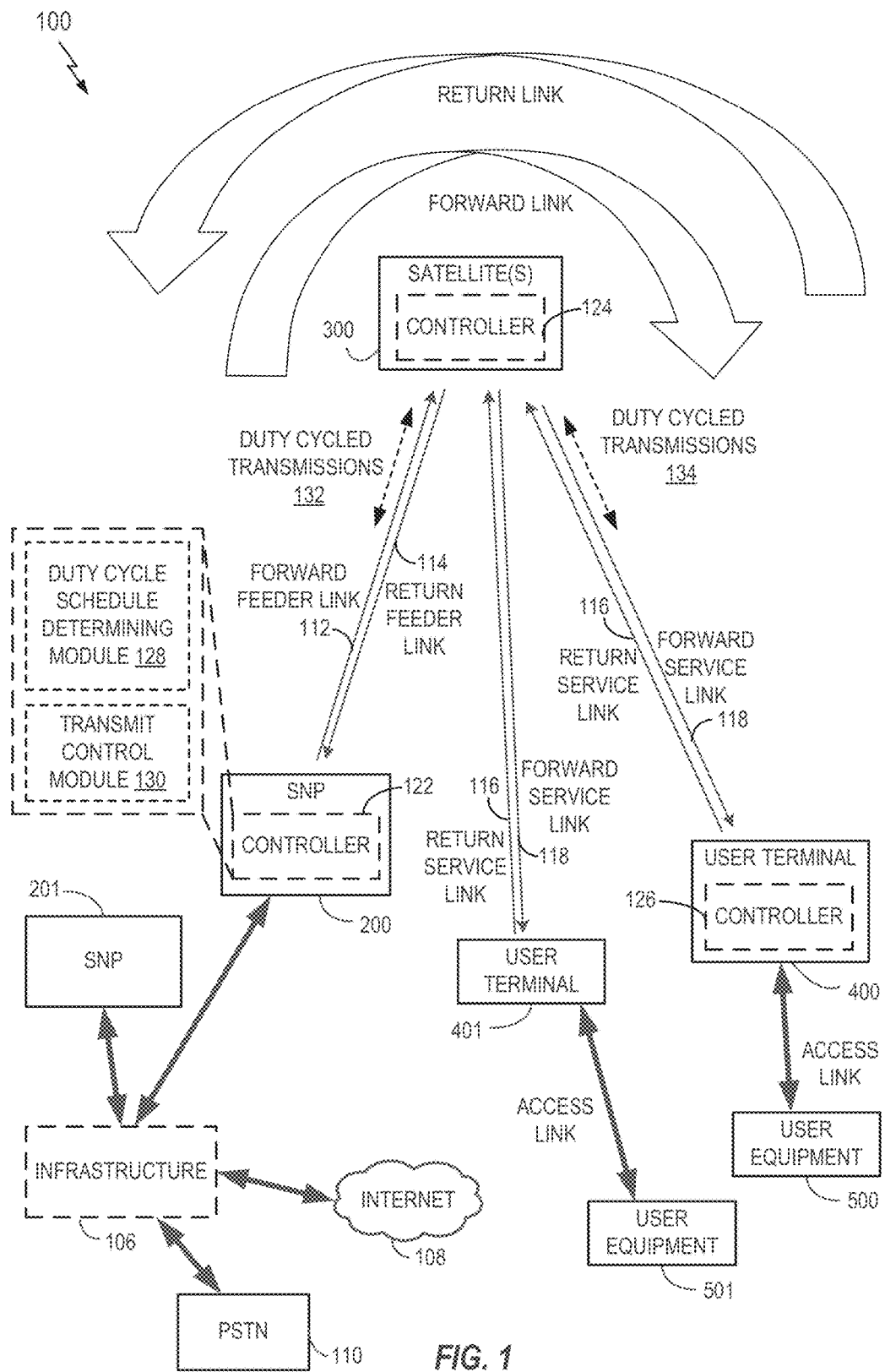
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), a satellite network portal (SNP) 200 (e.g., corresponding to a satellite gateway) in communication with the satellite 300, a plurality of UTs 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The SNP 200 may have access to the Internet 108 or one or more other types of public, semiprivate or private networks. In the example illustrated in FIG. 1, the SNP 200 is in communication with infrastructure 106, which is capable of accessing the Internet 108 or one or more other types of public, semiprivate or private networks. The SNP 200 may also be coupled to various types of communication backhaul, including, for example, landline networks such as optical fiber networks or public switched telephone networks (PSTN) 110. Further, in alternative implementations the SNP 200 may interface to the Internet 108, PSTN 110, or one or more other types of public, semiprivate or private networks without using the infrastructure 106. Still further, the SNP 200 may communicate with other SNPs, such as the SNP 201 through the infrastructure 106 or alternatively may be configured to communicate to the SNP 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the SNP 200 in both directions are called feeder links, whereas communication between the satellite and each of the UTs 400 and 401 in both directions are called service links. A signal path from the satellite 300 to a ground station, which may be the SNP 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the SNP 200 and terminating at the UT 400 through the satellite 300 is called a forward link, whereas a communication link in a direction originating from the UT 400 and terminating at the SNP 200 through the satellite 300 is called a return link or a reverse link. As such, the signal path from the SNP 200 to the satellite 300 is labeled a "Forward Feeder Link" 112 whereas the signal path from the satellite 300 to the SNP 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

In accordance with the teachings herein, the satellite communication system 100 uses duty cycling to control the transmit power of the satellite 300 and, thereby, control the EPFD received at the surface of the earth. In some implementations, the SNP 200 includes a controller 122 that employs duty cycling to control the transmit power of the satellite 300 on the forward service links 118. In some implementations, the satellite 300 includes a controller 124 that controls duty cycling on the forward service links 118 and/or the return feeder links 114. In some implementations, the UT 400 includes a controller 126 that employs duty cycling to control the transmit power of the satellite 300 on the return feeder links 114. Other components of the satellite communication system 100 may include corresponding controllers as well. For example, other SNPs, satellites, and UTs (not shown) may include a corresponding controller.

As shown in FIG. 1, the controller 122 includes a duty cycle schedule determining module 128 and transmit control module 130. The duty cycle schedule determining module 128 generates and/or receives a duty cycle schedule. For example, the duty cycle schedule determining module 128 may generate the duty cycle schedule based on information (e.g., ephemeris information and regulatory (e.g., ITU) limits) received via the infrastructure 106 and information (e.g., status and configuration information) received from satellites. As another example, the duty cycle schedule determining module 128 may receive the duty cycle schedule via the infrastructure 106 (e.g., from a network entity that generates, a priori, a duty cycle schedule).

The transmit control module 130 may control transmissions 132 on the forward feeder link 112 according to the duty cycle schedule. For example, for transmit duty cycle control within a subframe, a given one of the transmissions 132 may use X % of the subframe defined for communication on the forward feeder link 112. Consequently, corresponding transmissions 134 by the satellite 300 on a given one of the forward service links 118 will follow this duty cycle schedule. As a result, the transmissions 134 by the satellite 300 will be power controlled based on the duty cycle schedule.

The controller 124 and the controller 126 may include a duty cycle schedule determining module and/or transmit control module similar to the controller 122. These modules are only illustrated for the controller 122, however, to reduce the complexity of FIG. 1.

For an implementation where the satellite 300 includes a controller 124 that controls duty cycling for transmissions by the satellite 300, a duty cycle schedule determining module of the controller 124 may receive and/or generate a duty cycle schedule (e.g., as discussed herein). Thus, when the satellite 300 receives data to be transmitted, the satellite 300 can packetize the data and transmit the packetized data according to the duty cycle schedule. For example, a transmit control module of the controller 124 may control transmissions 134 on the forward service links 118 according to the duty cycle schedule and/or control transmissions 132 on the return feeder links 114 according to the duty cycle schedule.

For an implementation where the UT 400 includes a controller 126 that controls duty cycling for transmissions by the satellite 300, a duty cycle schedule determining module of the controller 126 may receive and/or generate a duty cycle schedule (e.g., as discussed herein). A transmit control module of the controller 126 may then control transmissions 134 on the return service link 116 according to the duty cycle schedule. For example, for transmit duty cycle control within a subframe, a given one of the transmissions 134 may use X % of the subframe defined for communication on the return service link 116. Consequently, corresponding transmissions 132 by the satellite 300 on a given one of the return feeder links 114 will follow this duty cycle schedule. As a result, the transmissions 132 by the satellite 300 will be power controlled based on the duty cycle schedule.

Figure 2:
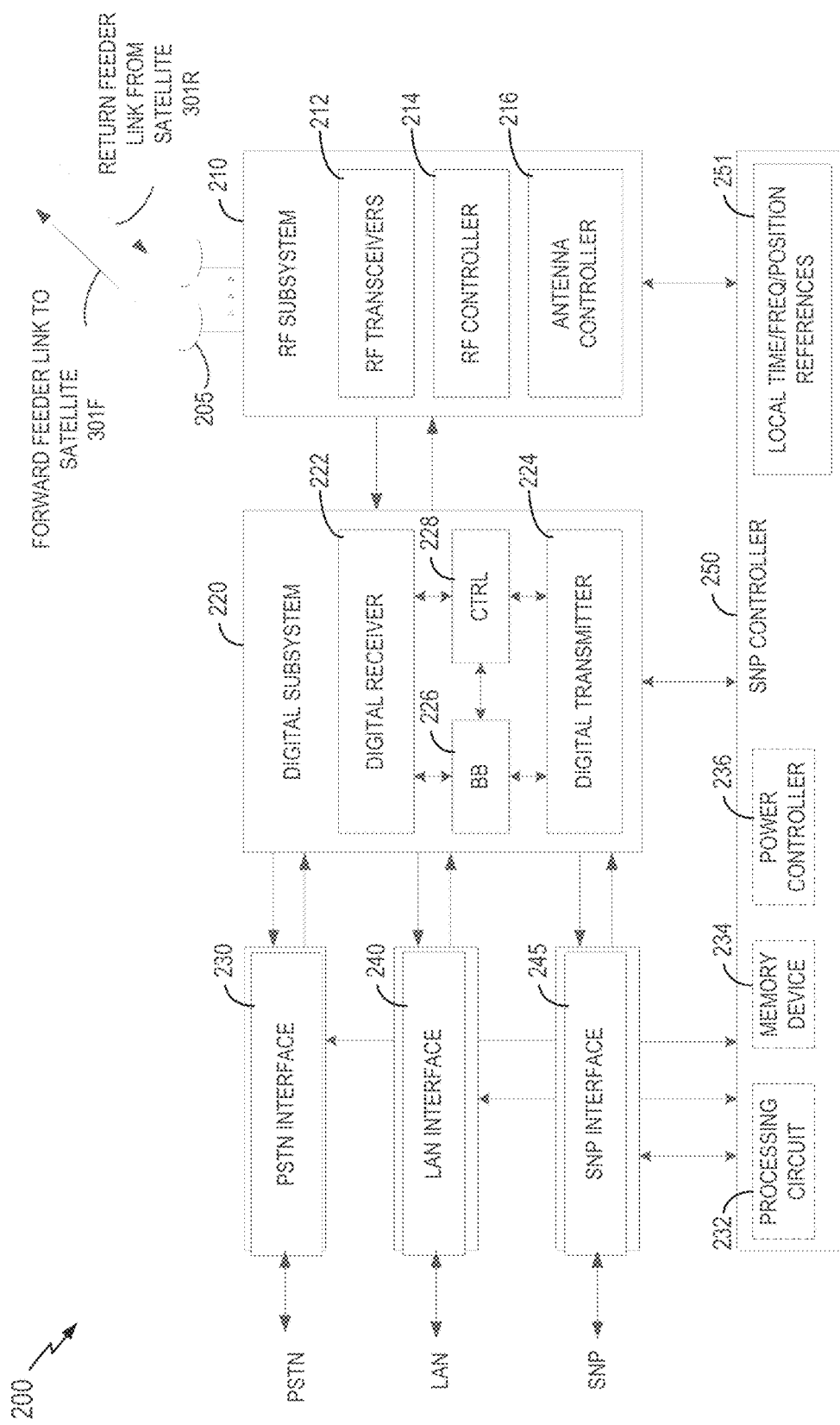
FIG. 2 is a block diagram of one example of a satellite network portal (SNP) of FIG. 1 in accordance with some aspects of the disclosure.

FIG. 2 is an example block diagram of the SNP 200, which also can apply to the SNP 201 of FIG. 1. The SNP 200 is shown to include a number of antennas 205, an RF subsystem 210, a digital subsystem 220, a Public Switched Telephone Network (PSTN) interface 230, a Local Area Network (LAN) interface 240, an SNP interface 245, and an SNP controller 250. The RF subsystem 210 is coupled to the antennas 205 and to the digital subsystem 220. The digital subsystem 220 is coupled to the PSTN interface 230, to the LAN interface 240, and to the SNP interface 245. The SNP controller 250 is coupled to the RF subsystem 210, the digital subsystem 220, the PSTN interface 230, the LAN interface 240, and the SNP interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the SNP 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the SNP 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The SNP interface 245 may provide communication signals to, and receive communication signals from, one or more other SNPs associated with the satellite communication system 100 of FIG. 1 (and/or to/from SNPs associated with other satellite communication systems, not shown for simplicity). For some implementations, the SNP interface 245 may communicate with other SNPs via one or more dedicated communication lines or channels (not shown for simplicity). For other implementations, the SNP interface 245 may communicate with other SNPs using the PSTN 110 and/or other networks such as the Internet 108 (see also FIG. 1). For at least one implementation, the SNP interface 245 may communicate with other SNPs via the infrastructure 106.

Overall SNP control may be provided by the SNP controller 250. The SNP controller 250 may plan and control utilization of the satellite 300's resources by the SNP 200. For example, the SNP controller 250 may analyze trends, generate traffic plans, allocate satellite resources, monitor (or track) satellite positions, and monitor the performance of the SNP 200 and/or the satellite 300. The SNP controller 250 may also be coupled to a ground-based satellite controller (not shown for simplicity) that maintains and monitors orbits of the satellite 300, relays satellite usage information to the SNP 200, tracks the positions of the satellite 300, and/or adjusts various channel settings of the satellite 300.

For the example implementation illustrated in FIG. 2, the SNP controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the SNP 200 with each other and/or with the satellite(s) 300. The local time, frequency, and position references 251 may also provide position information (e.g., ephemeris data) of the satellite(s) 300 to the various components of the SNP 200. Further, although depicted in FIG. 2 as included within the SNP controller 250, for other implementations, the local time, frequency, and the position references 251 may be a separate subsystem that is coupled to the SNP controller 250 (and/or to one or more of the digital subsystem 220 and the RF subsystem 210).

Although not shown in FIG. 2 for simplicity, the SNP controller 250 may also be coupled to a network control center (NCC) and/or a satellite control center (SCC). For example, the SNP controller 250 may allow the SCC to communicate directly with the satellite(s) 300, for example, to retrieve ephemeris data from the satellite(s) 300. The SNP controller 250 may also receive processed information (e.g., from the SCC and/or the NCC) that allows the SNP controller 250 to properly aim its antennas 205 (e.g., at the appropriate satellite(s) 300), to schedule beam transmissions, to coordinate handoffs, and to perform various other well-known functions.

The SNP controller 250 may include one or more of a processing circuit 232, a memory device 234, or a power controller 236 that independently or cooperatively perform power control-related operations for the SNP 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the power controller 236 is configured (e.g., programmed) to perform some or all of these operations. Although depicted in FIG. 2 as included within the SNP controller 250, for other implementations, one or more of the processing circuit 232, the memory device 234, or the power controller 236 may be a separate subsystem that is coupled to the SNP controller 250 (and/or to one or more of the digital subsystem 220 and the RF subsystem 210).

Figure 3:
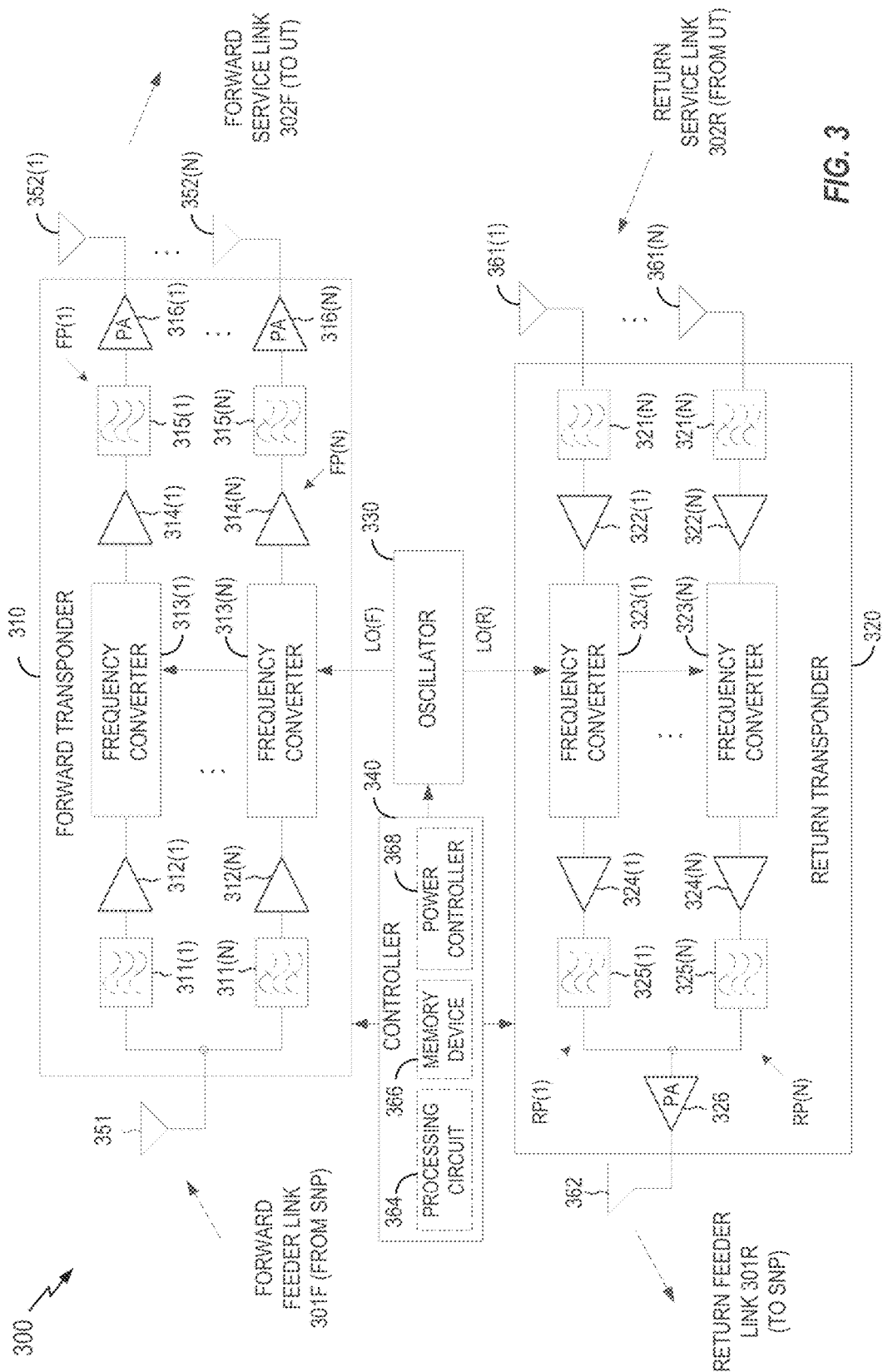
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the SNP 200 and the UT 400. It will be appreciated that the disclosure is not limited to any specific satellite configuration and any satellite or combinations of satellites that can provide the functional connection between the SNP 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the SNP 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the SNP 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the SNP 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the SNP 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the SNP 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

The controller 340 may include one or more of a processing circuit 364, a memory device 366, or a power controller 368 that independently or cooperatively perform power control-related operations for the satellite 300 as taught herein. In an example implementation, the processing circuit 364 is configured (e.g., programmed) to perform some or all of these operations. In another example implementation, the processing circuit 364 (e.g., in the form of a processor) executes code stored in the memory device 366 to perform some or all of these operations. In another example implementation, the power controller 368 is configured (e.g., programmed) to perform some or all of these operations. Although depicted in FIG. 3 as included within the controller 340, for other implementations, one or more of the processing circuit 364, the memory device 366, or the power controller 368 may be a separate subsystem that is coupled to the controller 340 (and/or to one or more of the forward transponder 310 and the return transponder 320).

Figure 4:
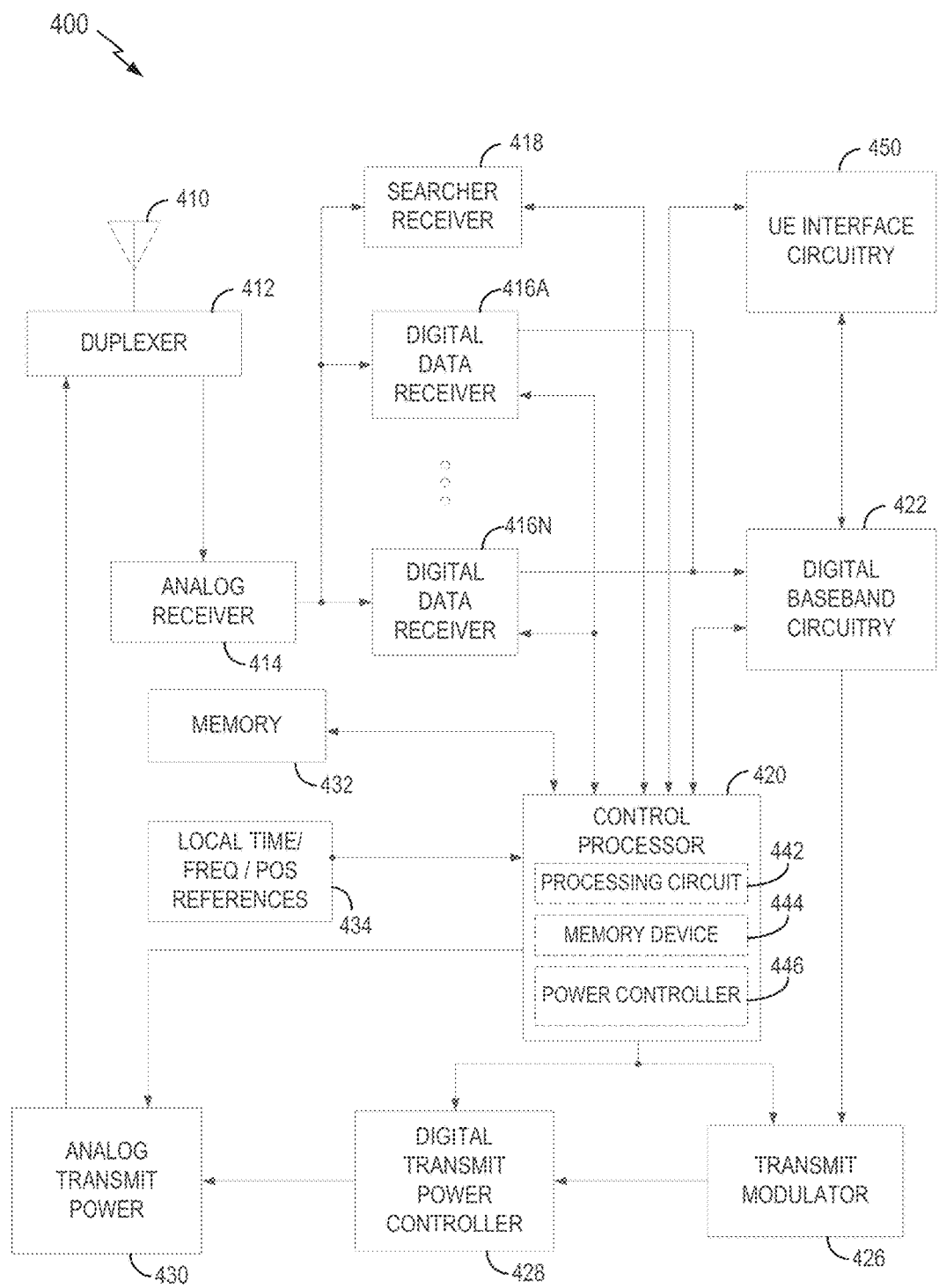
FIG. 4 is a block diagram of one example of a UT of FIG. 1 in accordance with some aspects of the disclosure.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a power controller 446 that independently or cooperatively perform power control-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the power controller 446 is configured (e.g., programmed) to perform some or all of these operations. Although depicted in FIG. 4 as included within the control processor 420, for other implementations, one or more of the processing circuit 442, the memory device 444, or the power controller 446 may be a separate subsystem that is coupled to the control processor 420.

Figure 5:
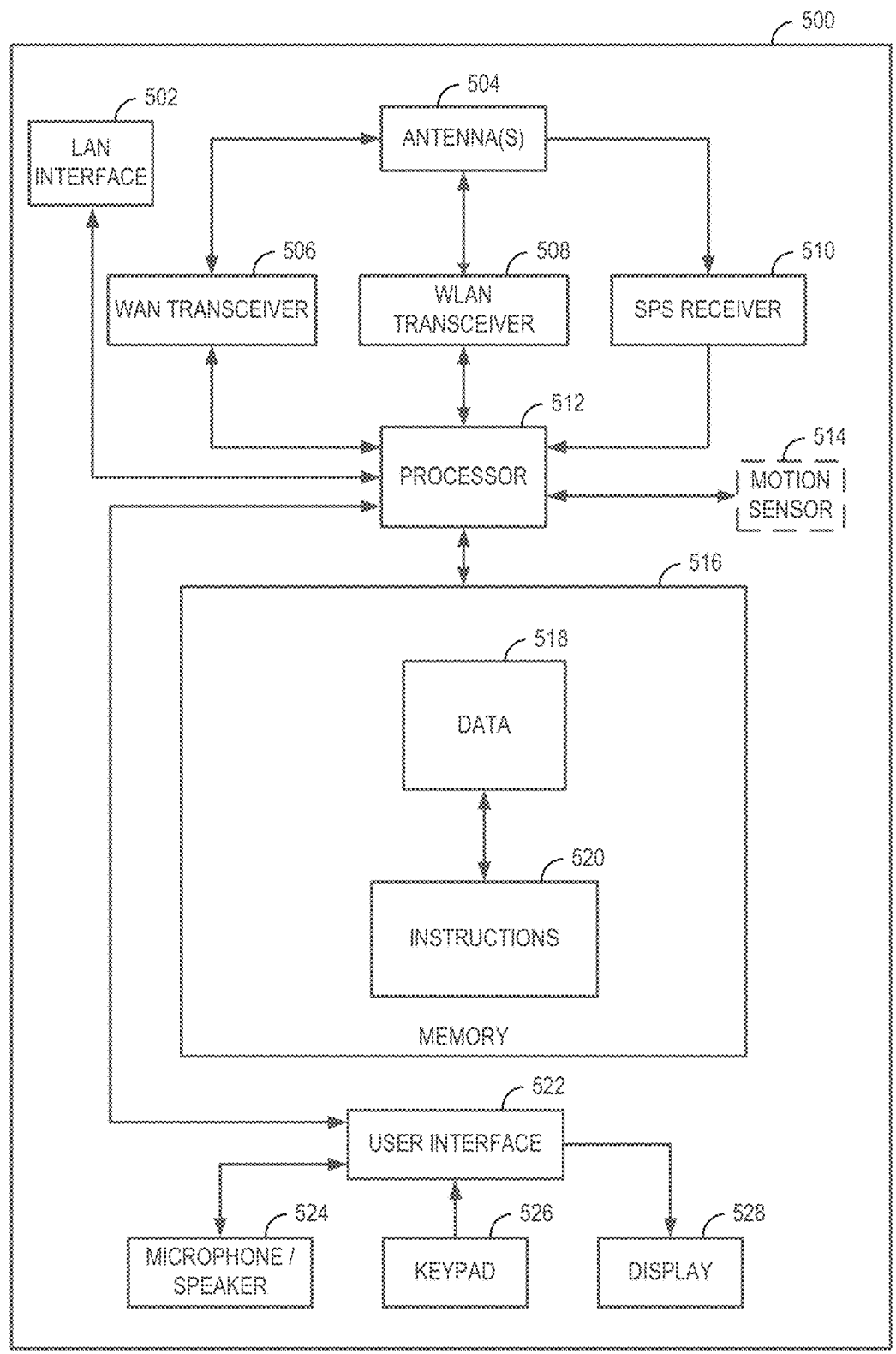
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the SNP's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an SNP. Thus, an SNP may have several NACs (e.g., implemented by the SNP controller 250 of FIG. 2), each of which controls a corresponding one of the satellites controlled by the SNP. In addition, a given satellite may support multiple beams. Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Satellite Power Control

Since satellites orbiting the earth may radiate power onto the surface of the earth, there are limits set by the International Telecommunication Union (ITU) regarding the maximum equivalent power flux density (EPFD) that is allowed to be radiated on the earth (e.g., within a given area). The International Telecommunication Union (ITU) regulations govern satellite operation at multiple frequency bands, including the Ku and Ka frequency bands. As well, individual countries may levy country-specific or region-specific EPFD regulations. These regulations define both downlink and uplink EPFD limits to protect GEO systems, as well as other systems operating in protected frequency bands. For the downlink, the regulations define allowed received power flux density on the surface of the earth, in both absolute (not-to-exceed) and percentage (temporal percentage) limits. The absolute limits are received EPFD levels which should never be exceeded. The percentile limits are received EPFD levels which should not be exceeded for specified percentages of time. An example of a percentile limit could be as follows: "90% of the time, the EPFD should not be greater than X," where X is the EPFD value defined by the regulation.

A satellite constellation, such as one consisting of LEO satellites, operating in these frequency bands uses power control techniques to control the power transmitted from each antenna on each satellite (e.g., for each satellite beam) to maximize the received power at every point on the earth's surface for which service is provided, subject to the ITU limits (or other regulatory limits). One technique involves changing the gain of an amplifier in the satellite. Another technique involves changing the set point of an amplifier in the satellite. Yet another techniques involves increasing or reducing the number of amplifier stages in an RF chain driving an antenna. In practice, however, there may be hardware limitations associated with an amplifier that limits the effectiveness of these techniques.

Moreover, since a satellite in a low earth orbit may complete a single orbit in a relatively short period of time (e.g., less than two hours), the region of the earth for which service is provided changes rapidly throughout the orbit, potentially requiring rapid changes in transmitted power to adhere to regulatory limits. For a satellite constellation consisting of multiple LEO satellites in multiple orbital planes, with potentially overlapping coverage, these changes may be even more rapid.

Duty Cycle-Based Power Control

Figure 6:
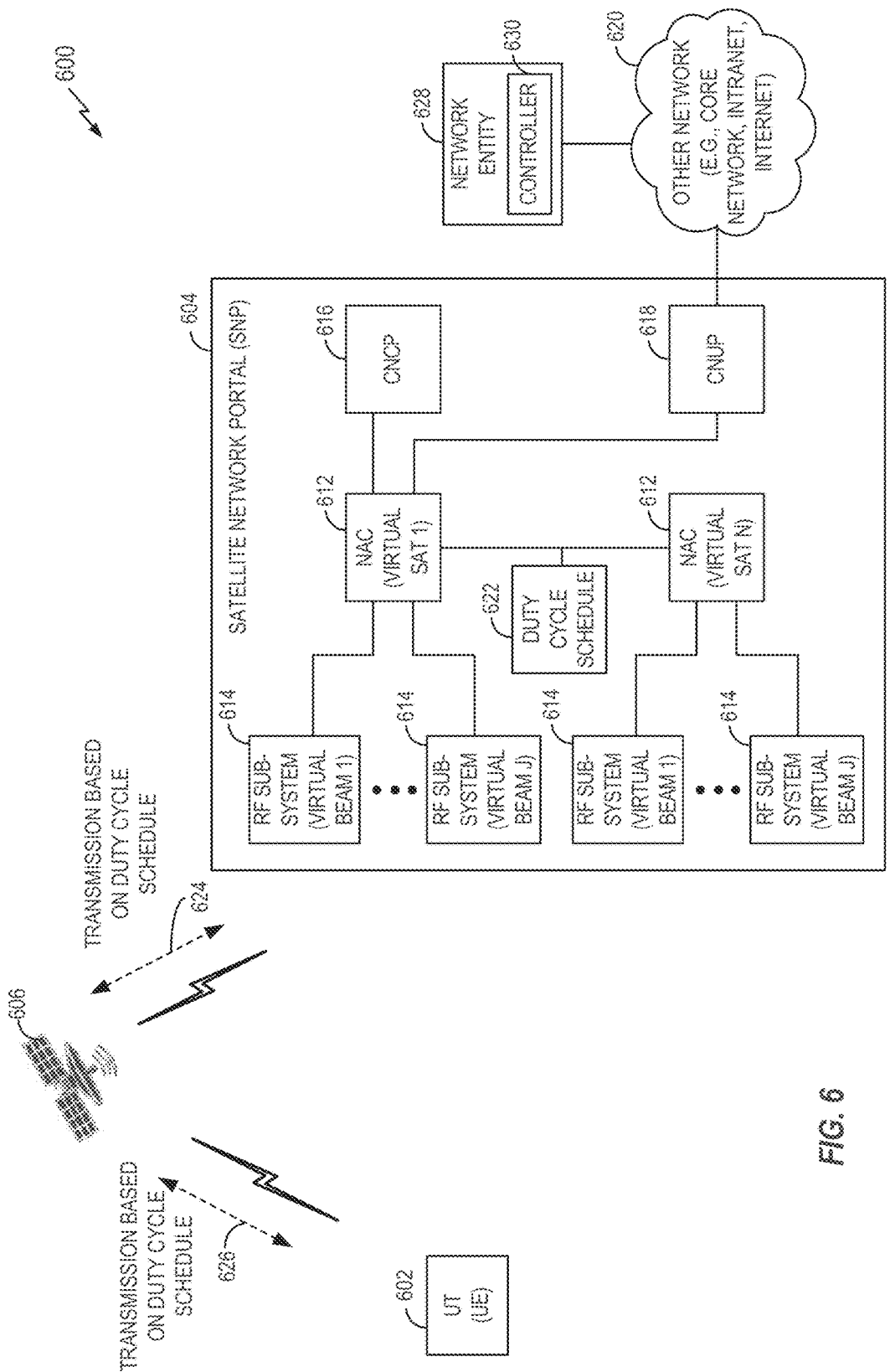
FIG. 6 is a block diagram of an example communication system in accordance with some aspects of the disclosure.

FIG. 6 illustrates a UT 602 in communication with an SNP 604 via a satellite 606 in a non-geosynchronous satellite communication system 600, such as a LEO satellite communication system for data, voice, video, or other communication. The UT 602, the SNP 604, and the satellite 606 may respectively correspond to, for example, the UT 400, the SNP 200, and the satellite 300 of FIG. 1.

The SNP 604 includes network access controllers (NACs) 612, each of which interfaces with one or more radio frequency (RF) subsystems 614 for communicating with the UT 602 and other UTs (not shown) via the satellite 606 (or some other satellite, not shown). The SNP 604 also includes a core network control plane (CNCP) 616 and a core network user plane (CNUP) 618, or other similar functionality (e.g., control and user plane functionality for other types of networks), for communicating with a network 620. The network 620 may represent, for example, one or more of a core network (e.g., 3G, 4G, 5G, etc.), an intranet, or the Internet.

The disclosure relates in some aspects to controlling the duty cycle of transmissions by the satellite 606 and other satellites (not shown) to control the average transmission power of each satellite. For example, to transmit 90% of the default transmit power of the satellite 606, the system 600 may be configured so the satellite 606 transmits, at most, 90% of the time. The duty cycle of the transmission may be gated within a relatively small time constant (e.g., much less than the time constant that is used to calculate the average transmit power) to achieve an average EPFD requirement defined by the ITU or other regulatory agencies. In some aspects, this technique can be used to meet percentile limits such as the ITU percentile limits. In some aspects, this technique can be used to meet absolute limits such as the ITU absolute limits (e.g., depending on the period of time used to calculate the maximum absolute EPFD).

In a typical implementation, the SNP 604 determines (e.g., receives or generates) a duty cycle schedule 622. For example, an NAC 612 may generate a duty cycle schedule for all satellites under its control based on information (e.g., ephemeris information and regulatory limits) received via the network 620 and information (e.g., status and configuration information) received from satellites. As another example, an NAC 612 may receive the duty cycle schedule for its satellites via the network 620 (e.g., from a network entity 628).

In some implementations, the duty cycle schedule 622 used by the system 600 is defined a priori. For example, a controller 630 of the network entity 628 may generate the duty cycle schedule 622 and send the duty cycle schedule 622 to control components of the system 600 during system startup and/or at other times. In particular, the network entity 628 may transmit the duty cycle schedule 622 to the SNP 604 via the network 620 (e.g., a core network, an intranet, or the Internet) or some other data transfer mechanism. For purposes of illustration, the network entity 628 is depicted as being outside of the network 620. However, the network entity 628 could be part of the network 620.

Other entities in the system could determine the duty cycle schedule 622 as well. For example, the satellite 606 could receive the duty cycle schedule 622 from the SNP 604 or generate a duty cycle schedule for itself based on duty cycle-related information received from the SNP 604. As another example, the UT 602 could receive the duty cycle schedule 622 from the SNP 604 via the satellite 606 or generate a duty cycle schedule for itself based on duty cycle-related information received from the satellite 606 and/or the SNP 604.

Figure 7:
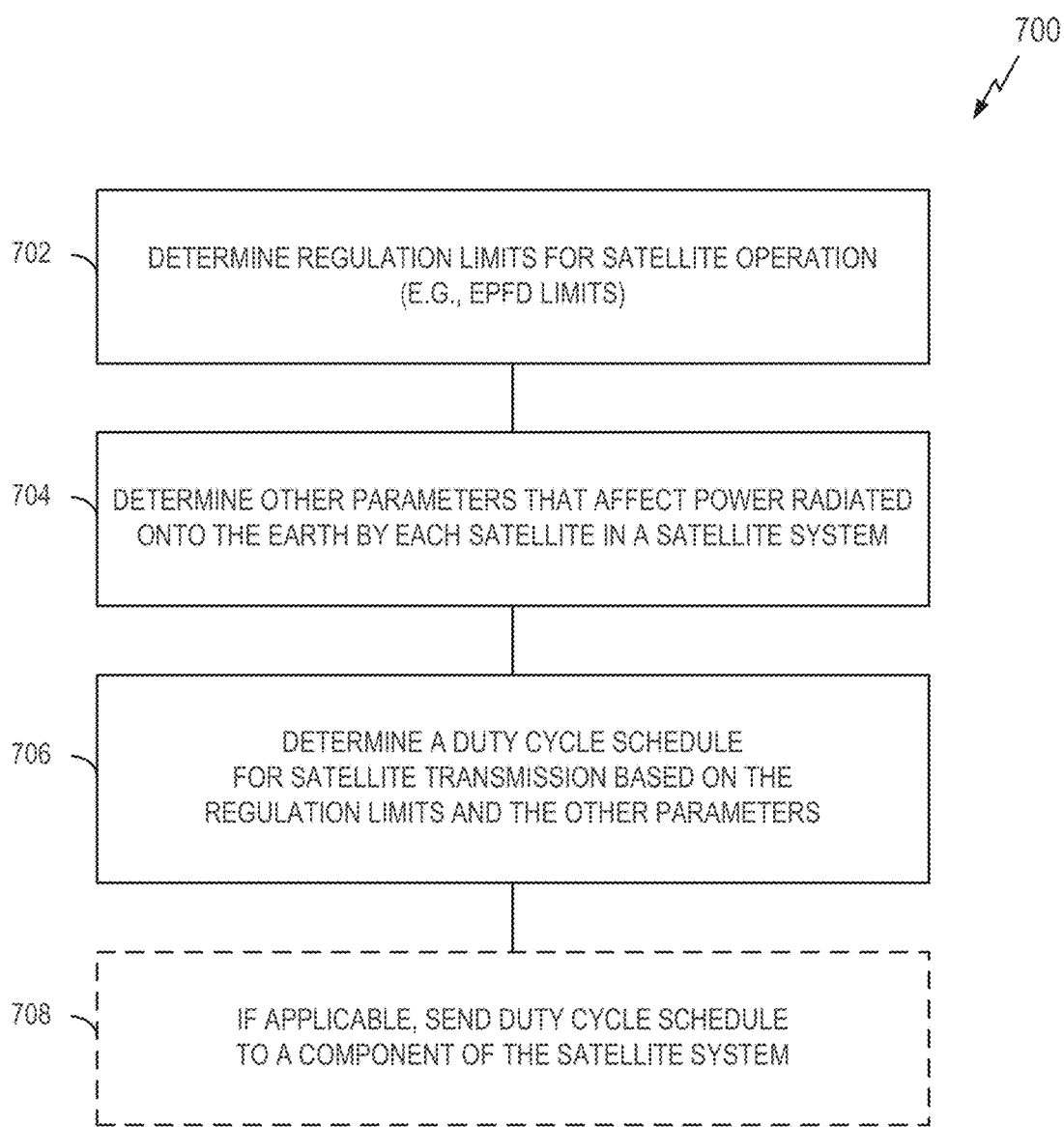
FIG. 7 is a flowchart illustrating an example of a process for determining a duty cycle schedule in accordance with some aspects of the disclosure.

FIG. 7 illustrates an overview of a process 700 for determining a duty cycle schedule in accordance with some aspects of the disclosure. The process 700 may take place, at least in part, within a processing circuit (e.g., the processing circuit 1510 of FIG. 15), which may be located in an SNP, a network entity, a satellite, a UT, or some other suitable apparatus. In some implementations, the process 700 may be performed by an SNP (e.g., the SNP 200 of FIG. 1) for at least one non-geosynchronous satellite. In some implementations, the process 700 represents operations performed, at least in part, by the controller 122, 124, or 126 of FIG. 1, the SNP controller 250 of FIG. 2, the controller 340 of FIG. 3, the control processor 420 of FIG. 4, the controller 1008 of FIG. 10, the controller 1108 or 1116 of FIG. 11, or the controller 1208 or 1218 of FIG. 12. Of course, in various aspects within the scope of the disclosure, the process 700 may be implemented by any suitable apparatus capable of supporting communication operations.

At block 702, an apparatus (e.g., an SNP, a network entity, a satellite, or a UT) determines regulation limits for satellite operations. For example, the apparatus may receive an indication of ITU EPFD limits (or other regulatory limits) or retrieve such an indication from a memory device.

At block 704, the apparatus determines other parameters that affect power radiated onto the earth by each satellite in a satellite system. As discussed in more detail below in conjunction with FIG. 8, these parameters may include, for example, at least one of: satellite ephemeris information, default satellite transmit power (e.g., a default maximum transmit power or some other default value), offered load (e.g., expected traffic load over a region for a satellite), satellite health, satellite failure, satellite beam status, satellite beam failure, current satellite position, satellite position drift, operational drift of at least one satellite component, operational variances of at least one satellite component, satellite beam orientation errors, satellite amplifier gain variation over a set of amplifiers, satellite antenna gain variation over a set of antennas, or directionality variation over a set of satellite antennas.

At block 706, the apparatus determines a duty cycle schedule for satellite transmission based on the regulation limits determined at block 702 and the other parameters determined at block 704. As one example, this may involve determining, for a given area on earth at a given point in time: 1) the satellites that radiate onto that area (e.g., as determined from the satellite ephemeris information and satellite location drift); 2) any satellite beam outages; and, 3) the EPFD that would be radiated onto the surface of the earth given the current effective transmit power of the satellites in the system that radiate onto that area at that time (e.g., taking into account at least one of: the default transmit power for each satellite, the offered load for each satellite, operational variances, or other variances). If the determined EPFD exceeds the allowed limits, the duty cycle for transmissions by one or more of the applicable satellites may be reduced to reduce the average transmission power from the applicable satellite(s).

Figure 8:
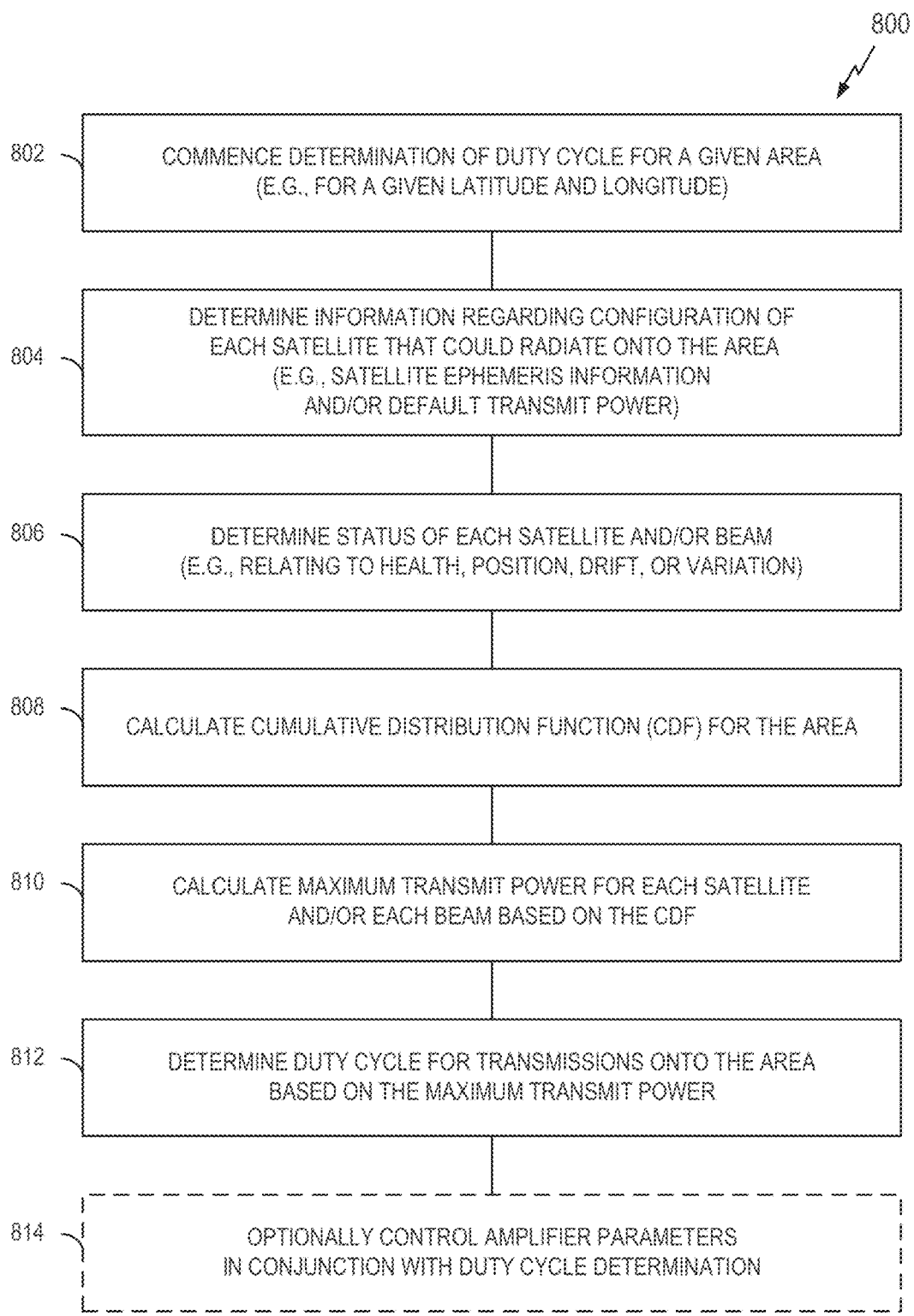
FIG. 8 is a flowchart illustrating an example of another process for determining a duty cycle in accordance with some aspects of the disclosure.

As discussed in more detail below in conjunction with FIG. 8, an overall duty cycle schedule can thus be defined that specifies, for each satellite, the duty cycle to be used at designated points in time along the orbit of the satellite (i.e., corresponding to different locations of the satellite along its respective orbital path). Since conditions may change as a satellite traverses its orbit (e.g., in different areas there may be overlapping coverage from different satellites) or may change over time (e.g., a satellite beam may fail or operating conditions may change), different duty cycles may be defined for a given satellite over time. Also, since some satellites may employ multiple beams, duty cycles may be defined for each beam of a given satellite.

At optional block 708, the apparatus may send the duty cycle schedule to a component of the satellite system. For example, a network entity may send the duty cycle schedule to one or more of the SNPs in the satellite system. As another example, an SNP may send the duty cycle schedule to each of the satellites served by the SNP. As yet another example, an SNP may send the duty cycle schedule to each of the UTs served by the SNP.

With the above in mind, several examples of factors that may be taken into consideration to determine duty cycles for satellite transmissions will now be described in more detail.

For purposes of explanation, the following describes scenarios where a duty cycle is determined on a location basis (e.g., a per latitude and longitude basis). It should be appreciated, however, that duty cycles may be determined based on some other suitable basis (e.g., other geographical boundaries) in other scenarios.

If the satellites' orbits are deterministic, the duty cycle to be used at each location (e.g., a latitude and longitude) of signal coverage can be determined. At a per location basis, the maximum power and the percentile power required to meet the regulatory limits are calculated. The transmit power of each satellite when the satellite coverage is over a particular location on the earth can thus be controlled through the use of duty cycling (and, optionally, through the use of other amplifier-based control techniques) to meet the calculated power for a particular location (e.g., a latitude and longitude). Thus, an overall schedule can be created indicating the duty cycle to be used at different positions of each satellite corresponding to the different locations (e.g., latitudes and longitudes) of satellite coverage as each satellite moves.

If a satellite generates multiple beams, a schedule can be created for each beam if the beam patterns are deterministic. For a given beam, the schedule indicates the duty cycle to be used at different positions of the satellite corresponding to the different locations (e.g., latitudes and longitudes) of beam coverage as the satellite moves.

In practice, satellite conditions may change over time. For example, a satellite may fail, the position accuracy of a satellite may drift over time, or the components of a satellite may experience operational drift (e.g., the power transmitted by an amplifier at a given set point may change over time). Thus, to provide optimum transmit power, the duty cycles to be used by satellites in a system also may be determined on a dynamic basis (e.g., periodically or aperiodically) based on these and/or other satellite conditions. This dynamic duty cycle management could be performed by SNPs and/or other suitable system components.

Regarding the satellite failure scenario, at some points in time, more than one satellite may be radiating power onto the same area on earth. An initial duty cycle schedule may thus specify the duty cycles to be used by each of the satellites to ensure that the regulatory limits (e.g., ITU limits) are met collectively by the satellites. In the event one of these satellites (e.g., an interfering satellite) fails, the transmit power of the satellite serving this area could be increased (with the remaining operational satellites still collectively operating within the regulatory limits). In the event multiple satellites are serving the area and an interfering satellite fails, the transmit power of each of the serving satellites could be increased (with the remaining operational satellites collectively still operating within the regulatory limits). Accordingly, upon detecting a satellite (or beam) failure, the duty cycle for another satellite (or beam) may be changed.

Regarding the satellite drift scenario, the orbit of a satellite might not be constant over time (position drift) or the operation of the components of the satellite may change over time (e.g., as electronic components age). These conditions may affect the amount of power radiated on a given area on earth by the satellite (e.g., either by a satellite serving that area or by a satellite interfering at that area). Accordingly, if any of these conditions are detected, the duty cycle for one or more satellites may be decreased to ensure that the regulatory limits are met or the duty cycle for one or more satellites may be increased to ensure that each satellite transmits at an optimum power level. In some implementations, these conditions (e.g., drift, beam orientation errors, etc.) are detected by a UT and/or an SNP. In some implementations, a satellite may report one or more of these conditions. For example, a satellite may report its position information (e.g., GPS coordinates) or attitude to an SNP.

Also, there may be variations in the operating conditions among the components of a given satellite or among the components of different satellites. For example, amplifier gain may vary over a set of amplifiers. As another example, antenna gain may vary over a set of antennas. Also, directionality of the antennas might deviate from the ideal. However, an a priori schedule may be developed (e.g., estimated) assuming all of these components are highly calibrated. Thus, more static variations such as these that affect the power radiated by a satellite also may be accounted for by adjusting the duty cycle schedule.

In some implementations, the definition of the duty cycles may be managed by an inner control loop and an outer control loop. As one example, the inner control loop could be based on a priori calculations directed to the power radiated at different locations (e.g. latitudes and longitudes). The outer control loop could be based on tracking of satellite failure, satellite drift, variations in operating conditions, satellite status (e.g., satellite health), satellite configuration, or other factors that affect the power radiated on the earth's surface over time.

An example of a process 800 that could be used to calculate a duty cycle based on the above factors will now be described with reference to FIG. 8. It should be appreciated that other algorithms could be used. The process 800 could take place, at least in part, within a processing circuit (e.g., the processing circuit 1510 of FIG. 15), which may be located in an SNP, a network entity, a satellite, a UT, or some other suitable apparatus. In some implementations, the process 800 may be performed by an SNP (e.g., the SNP 200 of FIG. 1) for at least one non-geosynchronous satellite. In some implementations, the process 800 represents operations performed, at least in part, by the controller 122, 124, or 126 of FIG. 1, the SNP controller 250 of FIG. 2, the controller 340 of FIG. 3, the control processor 420 of FIG. 4, the controller 1008 of FIG. 10, the controller 1108 or 1116 of FIG. 11, or the controller 1208 or 1218 of FIG. 12. Of course, in various aspects within the scope of the disclosure, the process 800 may be implemented by any suitable apparatus capable of supporting communication operations.

The process 800 commences at block 802. For example, for each designated area that is radiated upon by one or more satellites, an apparatus (e.g., an SNP, a network entity, a satellite, or a UT) may commence determination of a duty cycle to be used by any satellites that radiate onto that area. As discussed above, in some implementations, the area may correspond to a particular location (e.g., a particular latitude and longitude).

At block 804, the apparatus determines information regarding the configuration of each satellite that could radiate onto the designated area. For example, the apparatus may obtain the ephemeris information for the satellite constellation to identify the satellite(s) (and, if applicable, the particular beams of a satellite) that are expected to radiate onto that area, determine the times that the satellite(s)/beam(s) are expected to radiate onto the area, and determine whether multiple satellites/beams would radiate onto the area at the same time. As another example, the apparatus may obtain information that indicates the default transmit power that would be used by a particular satellite (e.g., for a particular beam) when radiating onto the area.

At block 806, the apparatus determines the status of each satellite and/or beam that could radiate onto the designated area. As one example, satellite status may relate to the health of the satellite (e.g., satellite failure, satellite beam status, satellite beam failure). As discussed above, the status (e.g., failure) of a particular satellite or satellite beam may be taken into account when setting the transmit power or duty cycle for another satellite or satellite beam. As another example, satellite status may relate to the position of the satellite (e.g., the current satellite position or satellite position drift). This information can be used, for example, to fine tune the timing of adjustments to the transmit power or duty cycle for a satellite or satellite beam since any deviations from the locations indicated by the ephemeris information can be accounted for based on the actual satellite position and/or drift. As yet another example, satellite status may relate to variances in the operation of a particular satellite (e.g., operational drift of at least one satellite component, operational variances of at least one satellite component, and satellite beam orientation errors). Here, manufacturing deviations from a nominal characteristic value of a component and/or changes in a characteristic over time may affect the amount of energy that a satellite (or satellite beam) actually radiates upon a given area. These differences can thus be taken into account to fine tune the timing of adjustments to the transmit power or duty cycle for a satellite or satellite beam. As still another example, satellite status may relate to variances between satellite components (e.g., satellite amplifier gain variation over a set of amplifiers, satellite antenna gain variation over a set of antennas, or directionality variation over a set of satellite antennas). In this case, differences between components (e.g., that are to collectively generate a beam) may affect the amount of energy that a satellite (or satellite beam) actually radiates upon a given area. These differences can also be taken into account to fine tune the timing of adjustments to the transmit power or duty cycle for a satellite or satellite beam. As a further example, satellite status may relate to offered load for a satellite. In this case, by taking into account the expected load over a region for each satellite of a set of satellites (e.g., satellites that could serve the region), the transmit power or duty cycle for each satellite may be adjusted to optimize transmissions by those satellites.

At block 808, the apparatus calculates a cumulative distribution function (CDF) for the area. For example, at a given spot on earth, a CDF can be calculated based on the energy (or power) that may be transmitted to that spot and the regulatory limits. The CDF may thus be calculated based on the absolute regulatory limits and/or the percentile regulatory limits, along with knowledge of the satellite constellation (e.g., where each satellite will be transmitting over time and at what transmit power as determined at blocks 804 and 806). Accordingly, the CDF may indicate whether and the extent to which the EPFD radiated onto that area by the satellite(s) of the constellation exceeds one of the regulatory limits. As discussed below, if a regulatory limit would be exceeded due to the transmit power currently designated for the satellite(s), the transmit duty cycle used by each satellite may be adjusted (reduced) to ensure that the regulatory limit is not exceeded.

To this end, at block 810, the apparatus calculates the maximum transmit power for each satellite and/or for each beam of each satellite based on the CDF calculated at block 808. For example, the apparatus may calculate (e.g., estimate) the maximum power that a particular satellite is allowed to radiate onto a given area. Here, the limits for all of the satellites that are contributing to the power at that spot are calculated—including the serving satellite and any satellites that may be contributing interference.

At block 812, the apparatus determines a duty cycle for transmission onto the area based on the maximum transmit power calculated at block 810. As discussed herein, the duty cycle is set to control the average transmit power radiated by a given satellite.

At optional block 814, the apparatus may control one or more amplifier parameters in conjunction with the determination of the duty cycle at block 812. For example, if a reduction in transmit power over the default transmit power is indicated, a reduced duty cycle may be selected in conjunction with a change in one or more of: changing the gain of an amplifier, changing the set point of an amplifier, or changing the number of amplifier stages used in an RF chain.

By performing the operations of blocks 802-814 for all of the areas on earth a given satellite may cover, a schedule can be generated for that satellite that specifies the duty cycle to be used (e.g., corresponding to the desired reduction to the default satellite transmit power) at each area to ensure the regulatory limits are met. A similar schedule can be generated for all of the satellites in the satellite constellation.

Referring again to FIG. 6, the duty cycle schedule 622 is used to control transmission of a composite transmit signal (e.g., one or more beams) from a satellite to all UTs within the coverage of the satellite. More generally, the duty cycle schedule 622 may be used to control transmission of a composite transmit signal from all satellites in the satellite constellation to all UTs within the coverage of the satellites.

Various entities may initiate a duty cycled transmission in different implementations. For example, the SNP 604, the satellite 606, or the UT 602 could initiate a transmission based on the duty cycle schedule 622, thereby directly or indirectly invoking a duty cycled transmission by the satellite 606.

In some implementations, the SNP 604 (e.g., an NAC 612) uses the duty cycle schedule 622 to control transmission by an RF subsystem 614. In this case, a designated RF subsystem 614 sends a transmission 624 based on the duty cycle schedule 622 to the satellite 606 via a forward feeder link. The satellite 606 (e.g., a so-called "bent-pipe" satellite) may then relay a corresponding transmission 626 based on the duty cycle schedule 622 to the UT 602 via a forward service link. Thus, in these implementations, a duty cycled transmission by the satellite 606 (e.g., the transmission 626 on the forward service link) is indirectly initiated by a duty cycle transmission by the SNP 604.

In some implementations, the SNP 604 (e.g., an NAC 612) sends the duty cycle schedule 622 to satellites in the system 600 (e.g., the satellite 606). In this case, the satellite 606 may send a transmission 626 based on the duty cycle schedule 622 to the UT 602 via a forward service link. Alternatively, the satellite 606 may send a transmission 624 based on the duty cycle schedule 622 to the SNP 604 via a return feeder link. In the latter case, the transmission 624 is received via a corresponding RF subsystem 614 and forwarded to a controlling NAC 612. Thus, in these implementations, a duty cycled transmission by the satellite 606 is directly initiated by the satellite 606.

In some implementations, the SNP 604 (e.g., an NAC 612) sends the duty cycle schedule 622 to UTs in the system 600 (e.g., the UT 602). In this case, the UT 602 may send a transmission 626 based on the duty cycle schedule 622 to the satellite 606 via a return service link. The satellite 606 (e.g., a so-called "bent-pipe" satellite) may then relay a corresponding transmission 624 based on the duty cycle schedule 622 to the SNP 604 via a return feeder link. Thus, in these implementations, a duty cycled transmission by the satellite 606 (e.g., the transmission 624 on the return feeder link) is indirectly initiated by a duty cycle transmission by the UT 602. The transmission 624 is received via a corresponding RF subsystem 614 and forwarded to a controlling NAC 612.

Figure 9:
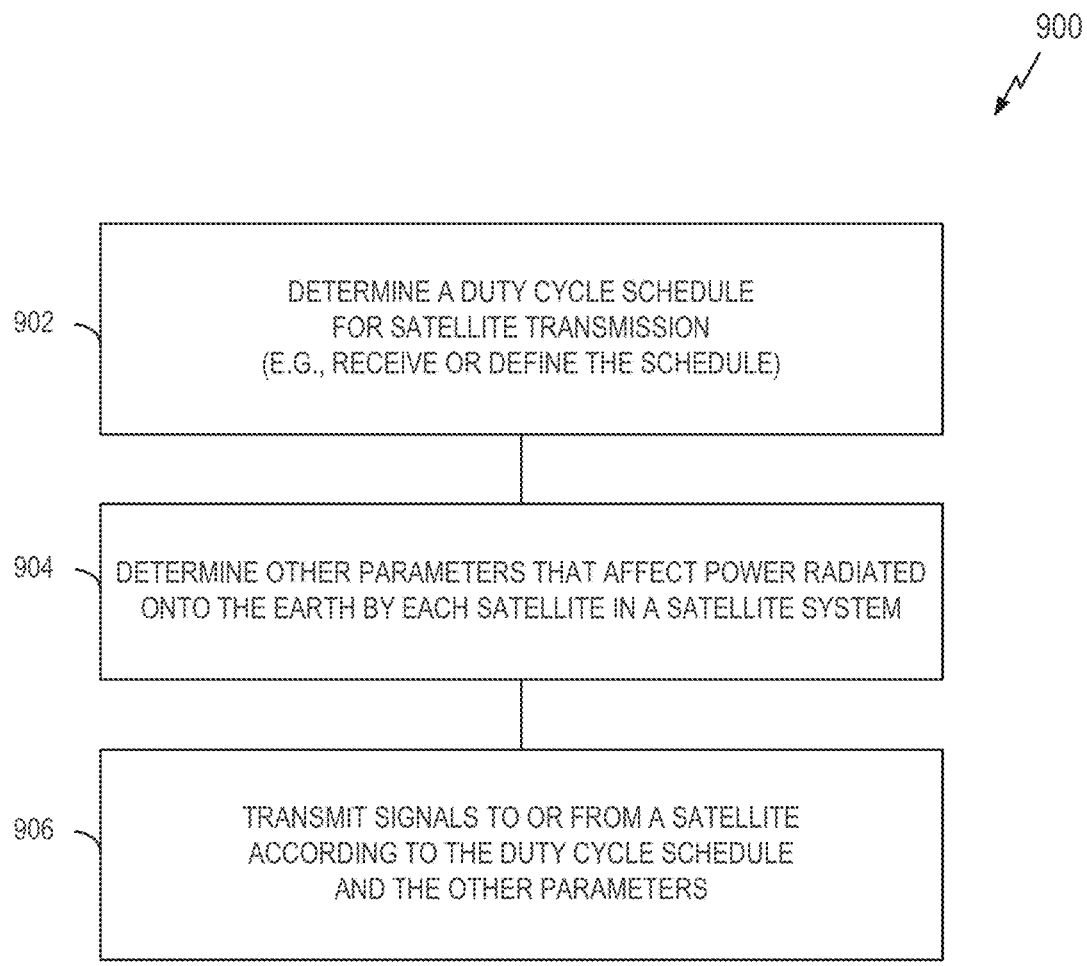
FIG. 9 is a flowchart illustrating an example of a process for transmitting signals according to a duty cycle schedule in accordance with some aspects of the disclosure.

FIG. 9 illustrates an overview of a process 900 for transmitting signals based on a duty cycle schedule in accordance with some aspects of the disclosure. The process 900 may take place, at least in part, within a processing circuit (e.g., the processing circuit 1310 of FIG. 13), which may be located in an SNP, a satellite, a UT, or some other suitable apparatus. In some implementations, the process 900 may be performed by an SNP (e.g., the SNP 200 of FIG. 1) for at least one non-geosynchronous satellite. In some implementations, the process 900 represents operations performed, at least in part, by the controller 122, 124, or 126 of FIG. 1, the SNP controller 250 and the subsystems 210 and 220 of FIG. 2, the controller 340 and the transponder 310 or 320 of FIG. 3, the control processor 420 and the transmit components of FIG. 4, the controller 1008 and the digital/RF subsystems 1010 of FIG. 10, the controller 1108 or 1116 and digital/RF subsystems 1110 or 1114 of FIG. 11, or the controller 1208 or 1218 and the digital/RF subsystems 1210 or the transponders 1212 of FIG. 12. Of course, in various aspects within the scope of the disclosure, the process 900 may be implemented by any suitable apparatus capable of supporting communication operations.

At block 902, an apparatus (e.g., an SNP, a satellite, or a UT) determines a duty cycle schedule for satellite transmission. For example, the apparatus may receive or define the duty cycle schedule as discussed herein (e.g., as discussed above in conjunction with FIGS. 7 and 8).

At block 904, the apparatus determines other parameters that affect power radiated onto the earth by each satellite in a satellite system. These parameters may include, for example, a specified gain of an amplifier, a specified set point for the amplifier, or the number of amplifier stages specified for an RF chain driving an antenna.

At block 906, the apparatus transmits signal to or from a satellite according to the duty cycle schedule determined at block 902 and the other parameters determined at block 904. For example, if the apparatus is a satellite, the operations of block 906 may involve transmitting signals to UTs where the transmit power is a function of a duty cycle specified for transmissions by the satellite on a forward service link, a specified gain of an amplifier for the satellite, a specified set point for the amplifier, and the number of amplifier stages specified for an RF chain driving an antenna. As another example, if the apparatus is an SNP, the operations of block 906 may involve transmitting signals to a satellite where the transmit power is a function of the RF amplifier settings for the SNP and a specified duty cycle for transmission by a satellite on a forward service link.

Figure 10:
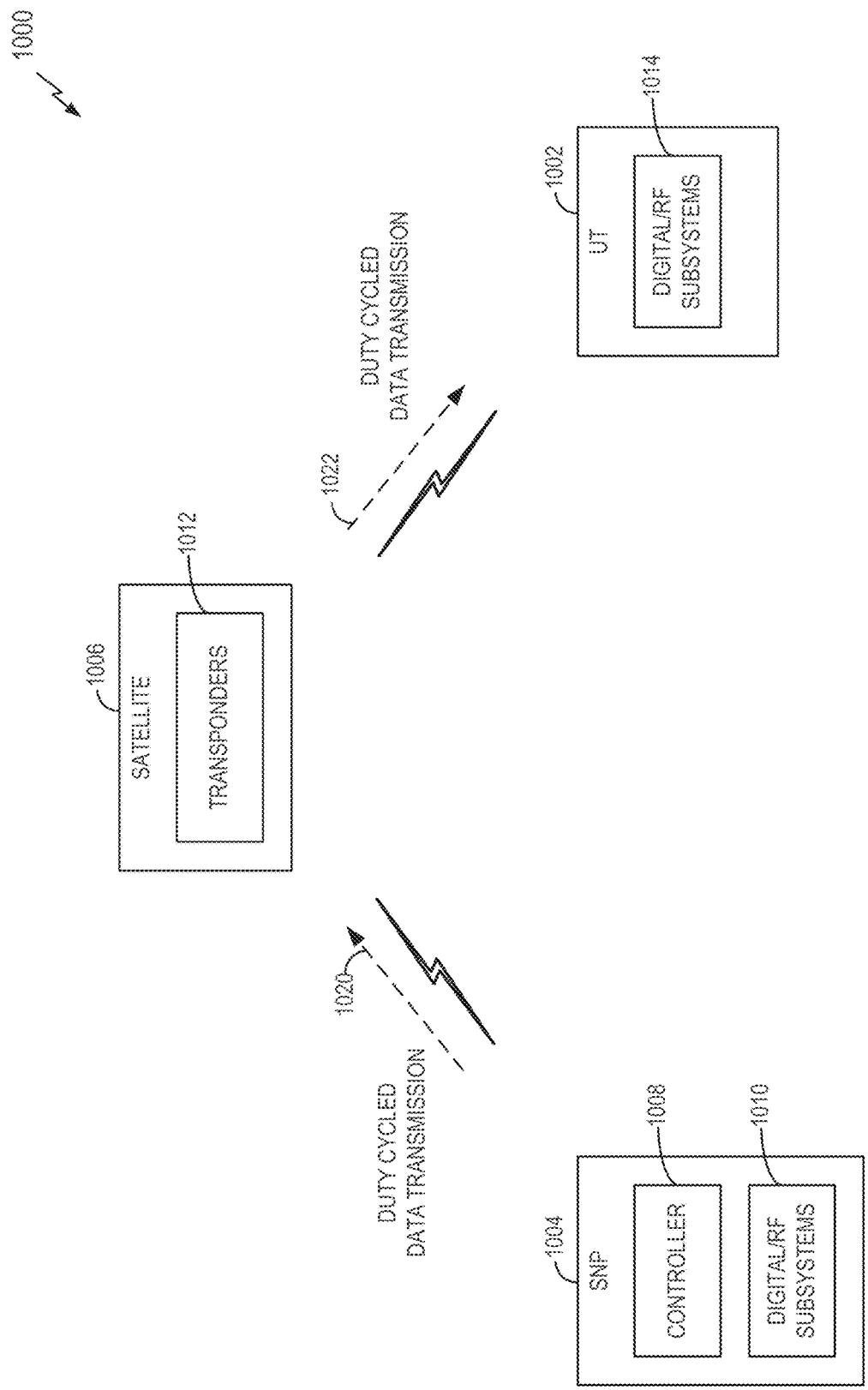
FIG. 10 is a block diagram of an example communication system employing duty cycled data transmission in accordance with some aspects of the disclosure.
Figure 11:
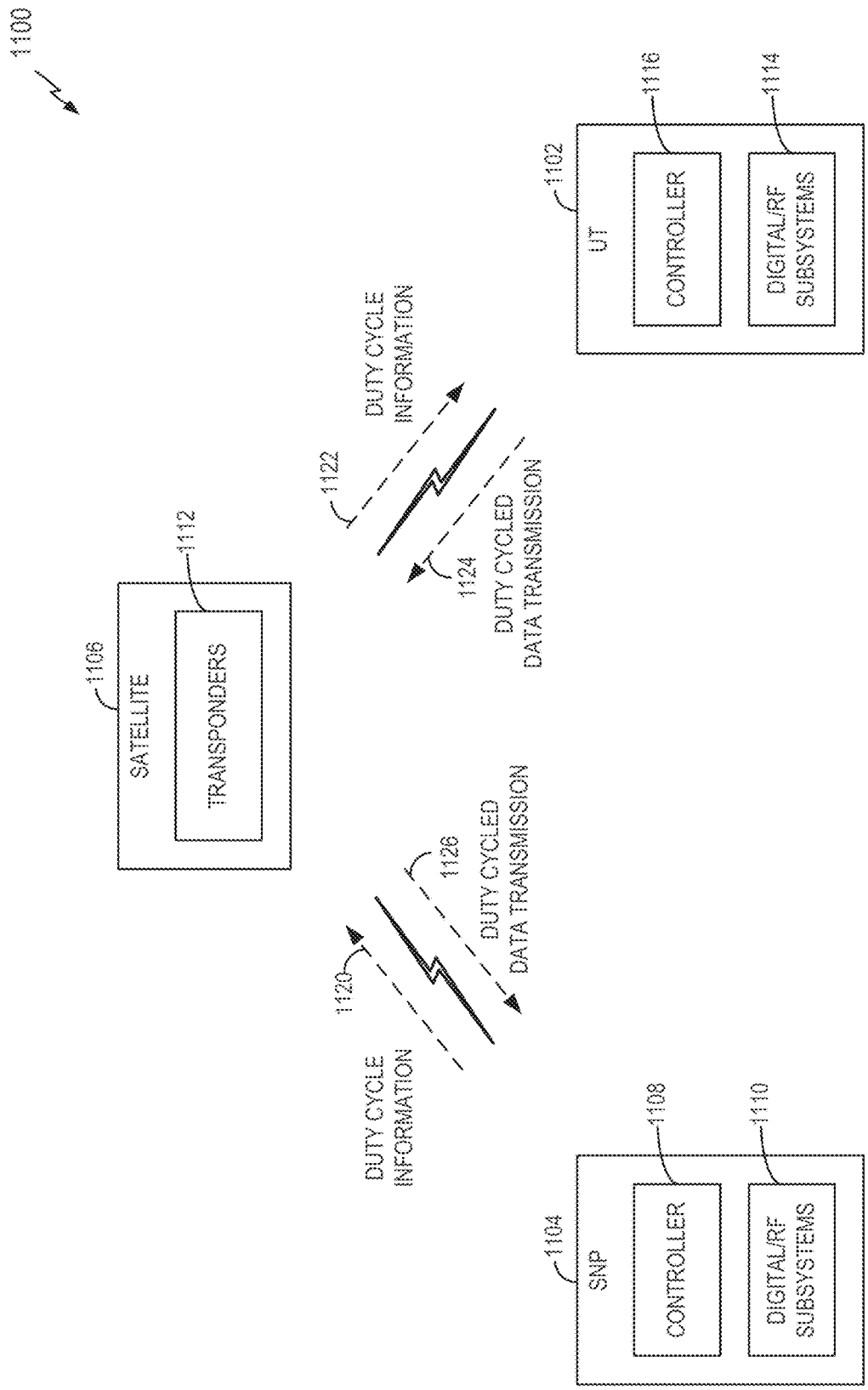
FIG. 11 is a block diagram of another example communication system employing duty cycled data transmission in accordance with some aspects of the disclosure.
Figure 12:
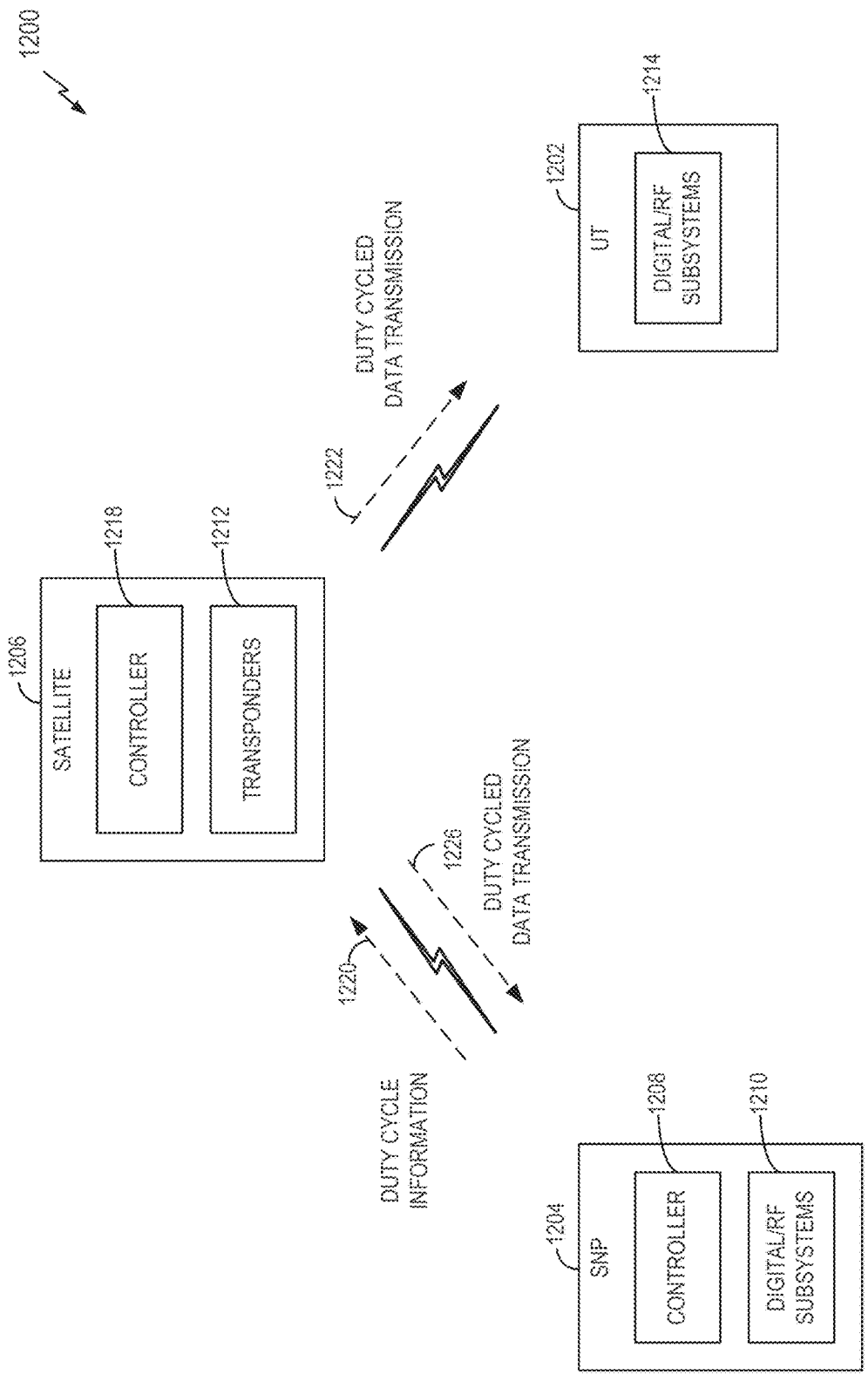
FIG. 12 is a block diagram of another example communication system employing duty cycled data transmission in accordance with some aspects of the disclosure.

As mentioned above, different entities may initiate a duty cycled transmission in different implementations. FIGS. 10-12 illustrate three example implementations in this regard.

FIG. 10 illustrates an example of a satellite communication system 1000 where an SNP 1004 initiates a duty cycled transmission. A UT 1002 communicates with the SNP 1004 via a satellite 1006. The SNP 1004 includes a controller 1008 that determines a duty cycle schedule for satellite communications in the system 1000. The SNP 1004 also includes digital/RF subsystems 1010 (e.g., transmitter and receiver components) for communicating with the satellite 1006. The satellite 1006 includes transponders 1012 (e.g., a forward transponder and a return transponder) for communicating with the SNP 1004 and the UT 1002. The UT 1002 includes digital/RF subsystems 1014 (e.g., transmitter and receiver components) for communicating with the satellite 1006.

When the SNP 1004 has data to send to the UT 1002, the controller 1008 causes the digital/RF subsystems 1010 to send a duty cycled data transmission 1020 to the satellite 1006. Typically, the duty cycled transmission 1020 is a waveform including overhead, signaling, and data. Transmission of this waveform is based on the duty cycle schedule (e.g., the duty cycle schedule 622 of FIG. 6) determined by the controller 1008. In other words, the SNP 1004 may format signals being sent to the satellite 1006 for transmission to the UT 1002 according to a duty cycle currently defined for transmissions by the satellite 1006. For example, if subframe-based communication is employed for the transmission 1020 on the forward feeder link, only a certain percentage (e.g., X %) of a defined subframe might be used for the transmission 1020 from the SNP 1004 to the satellite 1006 (i.e., using transmit duty cycle control within a subframe).

The transponders 1012 of the satellite 1006 (e.g., a so-called "bent-pipe" satellite) may relay waveforms received from the SNP 1004 via a forward feeder link to the UT 1002 via a forward service link. Since the received transmission 1020 is duty cycled, the satellite 1006 will send a duty cycled data transmission 1022 to the UT 1002. Thus, the duty cycle of the transmission 1022 will be based on the duty cycle schedule used by the SNP 1004. As a result, the average transmission power of the satellite 1006 as received by the digital RF subsystems 1014 of the UT 1002 will be limited based on this duty cycle schedule. For example, if the satellite 1006 transmits a waveform in only X % of a subframe for the forward service link to the UT 1002, the average transmission power for the transmission 1022 may be at most X % of the default transmission power for a subframe on that forward service link.

The SNP 1004 may use control signaling (e.g., over a control channel) to inform each of its served UTs (e.g., including the UT 1002) which subframes will be used to transfer information to the UTs and where the data is in each subframe. Thus, in some aspects, the invocation and/or use of duty cycling may be transparent to the UTs and the satellites in the system 1000.

It should be appreciated that the disclosed duty cycle techniques could be used for any form of temporal boundaries. For example, a duty cycle could be applied to frames, subframes, portions of subframes, super-frames, timeslots, and so on.

FIG. 11 illustrates an example of a satellite communication system 1100 where a UT 1102 initiates a duty cycled transmission. That is, duty cycling may be employed on the return link from the UT 1102 to an SNP 1104 via a satellite 1106. Duty cycling could be used here, for example, if the return link uses temporal boundaries (e.g., a time division multiple access (TDMA) waveform), particularly if percentile power limits are applicable.

The SNP 1104 includes a controller 1108 that supplies duty cycle information for satellite communications in the system 1100. The SNP 1104 also includes digital/RF subsystems 1110 (e.g., transmitter and receiver components) for communicating with the satellite 1106. The satellite 1106 includes transponders 1112 (e.g., a forward transponder and a return transponder) for communicating with the SNP 1104 and the UT 1102. The UT 1102 includes digital/RF subsystems 1114 (e.g., transmitter and receiver components) for communicating with the satellite 1106. The UT 1102 also includes a controller 1116 that determines a duty cycle schedule for satellite communications in the system 1100.

In some implementations, the controller 1116 of the UT 1102 obtains duty cycle information from the controller 1108 of the SNP 1104. For example, the controller 1108 may send duty cycle information 1120 to the satellite 1106 via a forward feeder link, whereupon the satellite 1106 sends corresponding (e.g., forwarded) duty cycle information 1122 to the UT 1102 via a forward service link. This duty cycle information may include, for example, a duty cycle schedule to be used by the controller 1116 for return link transmissions or information that the controller 1116 uses to determine a duty cycle schedule to be used for return link transmissions.

Accordingly, the UT 1102 may use duty cycling on transmissions over the return service link to the satellite 1106, and the satellite 1106 forwards corresponding duty cycled transmissions to the SNP 1104 over the return feeder link. For example, when the UT 1102 has data to send to the SNP 1104, the controller 1116 causes the digital/RF subsystems 1114 to send a duty cycled data transmission 1124 to the satellite 1106. The duty cycled transmission 1124 may be a waveform including overhead, signaling, and data. Transmission of this waveform is based on the duty cycle schedule (e.g., the duty cycle schedule 622 of FIG. 6) determined by the controller 1116. For example, the transmission 1124 may use X % of each available subframe on the return service link.

The transponders 1112 of the satellite 1106 (e.g., a so-called "bent-pipe" satellite) may relay waveforms received from the UT 1102 on a return service link to the SNP 1104 via a return feeder link. Since the received transmission 1124 is duty cycled, the satellite 1106 will send a duty cycled data transmission 1126 to the SNP 1104. Thus, the duty cycle of the transmission 1126 will be based on the duty cycle schedule used by the UT 1102. As a result, the average transmission power of the satellite 1106 as received by the digital RF subsystems 1110 of the SNP 1104 will be limited based on this duty cycle schedule. For example, if the satellite 1106 transmits a waveform in only X % of a subframe for the return feeder link to the SNP 1104, the average transmission power for the transmission 1126 may be at most X % of the default transmission power for a subframe on that return feeder link.

The UT 1102 may use control signaling (e.g., over a control channel) to inform each of its serving SNPs (e.g., including the SNP 1104) which subframes will be used to transfer information to the SNPs and where the data is in each subframe. Thus, in some aspects, the invocation and/or use of duty cycling may be transparent to the SNPs and the satellites in the system 1000.

FIG. 12 illustrates an example of a satellite communication system 1200 where a satellite 1206 initiates a duty cycled transmission. That is, the satellite 1206 may control the duty cycling used for the satellite's transmissions (e.g., by transmitting in X % of a subframe) to thereby control an average transmission power of the satellite 1206 when the satellite 1206 transmits to UTs and/or SNPs.

In FIG. 12, a UT 1202 communicates with an SNP 1204 via the satellite 1206. The SNP 1204 includes a controller 1208 that supplies duty cycle information for satellite communications in the system 1200. The SNP 1204 also includes digital/RF subsystems 1210 (e.g., transmitter and receiver components) for communicating with the satellite 1202. The satellite 1206 includes transponders 1212 (e.g., a forward transponder and a return transponder) for communicating with the SNP 1204 and the UT 1202. The satellite 1206 also includes a controller 1118 that determines a duty cycle schedule for satellite communications in the system 1100. The UT 1202 includes digital/RF subsystems 1214 (e.g., transmitter and receiver components) for communicating with the satellite 1206.

In this case, the satellite 1206 will receive and/or generate a duty cycle schedule (e.g., as discussed herein). In some implementations, the controller 1218 of the satellite 1206 obtains duty cycle information from the controller 1208 of the SNP 1204. For example, the controller 1208 may send duty cycle information 1220 to the satellite 1206 via a forward feeder link. This duty cycle information may include, for example, a duty cycle schedule to be used by the controller 1218 for forward and/or return link transmissions or information that the controller 1218 uses to determine a duty cycle schedule to be used for forward and/or return link transmissions.

When the satellite 1206 receives data to be transmitted, the satellite can packetize the data and transmit the packetized data according to the duty cycle schedule. The satellite 1206 may forward the data to the UT 1202 or the SNP 1204 based on the duty cycle schedule. Each of these scenarios will be discussed in turn.

When the satellite 1206 receives data from the SNP 1204 to be sent to the UT 1202, the controller 1218 causes the transponders 1212 to send a duty cycled data transmission 1222 to the UT 1202. The duty cycled transmission 1222 may be a waveform including overhead, signaling, and data. Transmission of this waveform is based on the duty cycle schedule (e.g., the duty cycle schedule 622 of FIG. 6) determined by the controller 1218. As a result, the average transmission power of the satellite 1206 as received by the digital RF subsystems 1214 of the UT 1202 will be limited based on this duty cycle schedule. For example, if the satellite 1206 transmits a waveform in only X % of a subframe for the forward service link to the UT 1202, the average transmission power for the transmission 1222 may be at most X % of the default transmission power for a subframe on that forward service link.

When the satellite 1206 receives data from the UT 1202 to be sent to the SNP 1204, the controller 1218 causes the transponders 1212 to send a duty cycled data transmission 1226 to the SNP 1204. The duty cycled transmission 1226 may be a waveform including overhead, signaling, and data. Transmission of this waveform is based on the duty cycle schedule (e.g., the duty cycle schedule 622 of FIG. 6) determined by the controller 1218. As a result, the average transmission power of the satellite 1206 as received by the digital RF subsystems 1210 of the SNP 1204 will be limited based on this duty cycle schedule. For example, if the satellite 1206 transmits a waveform in only X % of a subframe for the return feeder link to the SNP 1204, the average transmission power for the transmission 1226 may be at most X % of the default transmission power for a subframe on that return feeder link.

The satellite 1206 may use control signaling (e.g., over a control channel) to inform each of its associated UTs and/or SNPs (e.g., including the UT 1202 and/or the SNP 1204) which subframes will be used to transfer information to the UTs and/or SNPS, and where the data is in each subframe. Thus, in some aspects, the invocation and/or use of duty cycling may be transparent to the UTs and the SNPs in the system 1000.

Example Apparatus

Figure 13:
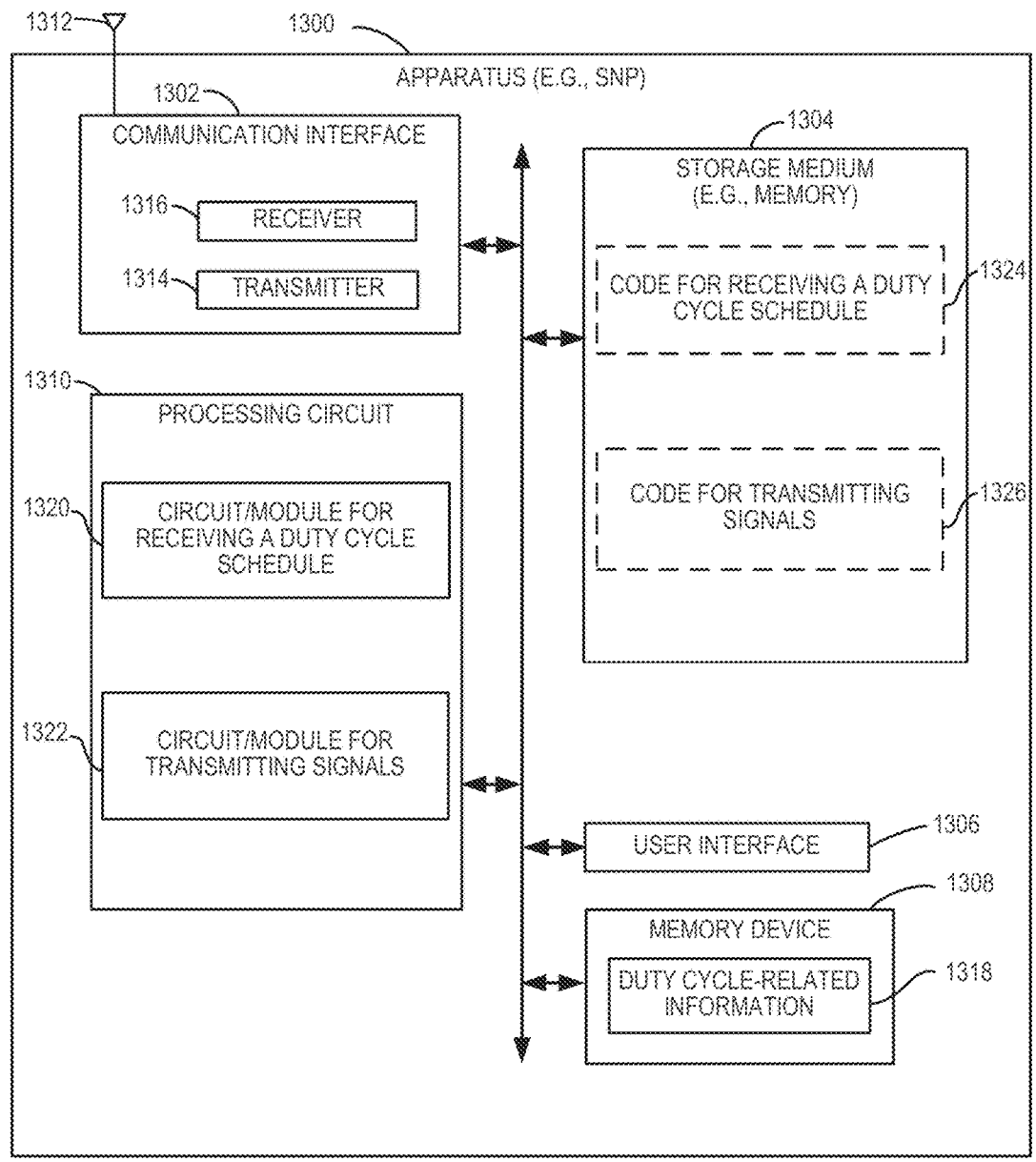
FIG. 13 is a block diagram illustrating an example hardware implementation for an apparatus (e.g., an electronic device) that can support power control in accordance with some aspects of the disclosure.

FIG. 13 illustrates a block diagram of an example hardware implementation of an apparatus 1300 configured to communicate according to one or more aspects of the disclosure. For example, the apparatus 1300 could embody or be implemented within an SNP, a satellite, a UT, or some other type of device that supports satellite communication. In various implementations, the apparatus 1300 could embody or be implemented within a gateway, a ground station, a vehicular component, or any other electronic device having circuitry.

The apparatus 1300 includes a communication interface (e.g., at least one transceiver) 1302, a storage medium 1304, a user interface 1306, a memory device (e.g., a memory circuit) 1308, and a processing circuit (e.g., at least one processor) 1310. In various implementations, the user interface 1306 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 13. The signaling bus may include any number of interconnecting buses and bridges depending on the specific application of the processing circuit 1310 and the overall design constraints. The signaling bus links together various circuits such that each of the communication interface 1302, the storage medium 1304, the user interface 1306, and the memory device 1308 are coupled to and/or in electrical communication with the processing circuit 1310. The signaling bus may also link various other circuits (not shown) such as timing sources, peripherals, voltage regulators, and power management circuits, which are well known in the art, and therefore, will not be described any further.

The communication interface 1302 provides a means for communicating with other apparatuses over a transmission medium. In some implementations, the communication interface 1302 includes circuitry and/or programming adapted to facilitate the communication of information bi-directionally with respect to one or more communication devices in a network. In some implementations, the communication interface 1302 is adapted to facilitate wireless communication of the apparatus 1300. In these implementations, the communication interface 1302 may be coupled to one or more antennas 1312 as shown in FIG. 13 for wireless communication within a wireless communication system. The communication interface 1302 can be configured with one or more standalone receivers and/or transmitters, as well as one or more transceivers. In the illustrated example, the communication interface 1302 includes a transmitter 1314 and a receiver 1316. The communication interface 1302 serves as one example of a means for receiving and/or means transmitting.

The memory device 1308 may represent one or more memory devices. As indicated, the memory device 1308 may maintain duty cycle-related information 1318 along with other information used by the apparatus 1300. In some implementations, the memory device 1308 and the storage medium 1304 are implemented as a common memory component. The memory device 1308 may also be used for storing data that is manipulated by the processing circuit 1310 or some other component of the apparatus 1300.

The storage medium 1304 may represent one or more computer-readable, machine-readable, and/or processor-readable devices for storing programming, such as processor executable code or instructions (e.g., software, firmware), electronic data, databases, or other digital information. The storage medium 1304 may also be used for storing data that is manipulated by the processing circuit 1310 when executing programming. The storage medium 1304 may be any available media that can be accessed by a general purpose or special purpose processor, including portable or fixed storage devices, optical storage devices, and various other mediums capable of storing, containing or carrying programming.

By way of example and not limitation, the storage medium 1304 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1304 may be embodied in an article of manufacture (e.g., a computer program product). By way of example, a computer program product may include a computer-readable medium in packaging materials. In view of the above, in some implementations, the storage medium 1304 may be a non-transitory (e.g., tangible) storage medium.

The storage medium 1304 may be coupled to the processing circuit 1310 such that the processing circuit 1310 can read information from, and write information to, the storage medium 1304. That is, the storage medium 1304 can be coupled to the processing circuit 1310 so that the storage medium 1304 is at least accessible by the processing circuit 1310, including examples where at least one storage medium is integral to the processing circuit 1310 and/or examples where at least one storage medium is separate from the processing circuit 1310 (e.g., resident in the apparatus 1300, external to the apparatus 1300, distributed across multiple entities, etc.).

Programming stored by the storage medium 1304, when executed by the processing circuit 1310, causes the processing circuit 1310 to perform one or more of the various functions and/or process operations described herein. For example, the storage medium 1304 may include operations configured for regulating operations at one or more hardware blocks of the processing circuit 1310, as well as to utilize the communication interface 1302 for wireless communication utilizing their respective communication protocols.

The processing circuit 1310 is generally adapted for processing, including the execution of such programming stored on the storage medium 1304. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1310 is arranged to obtain, process and/or send data, control data access and storage, issue commands, and control other desired operations. The processing circuit 1310 may include circuitry configured to implement desired programming provided by appropriate media in at least one example. For example, the processing circuit 1310 may be implemented as one or more processors, one or more controllers, and/or other structure configured to execute executable programming. Examples of the processing circuit 1310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1310 are for illustration and other suitable configurations within the scope of the disclosure are also contemplated.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 9 and 14. As used herein, the term "adapted" in relation to the processing circuit 1310 may refer to the processing circuit 1310 being one or more of configured, employed, implemented, and/or programmed to perform a particular process, function, operation and/or routine according to various features described herein.

Figure 14:
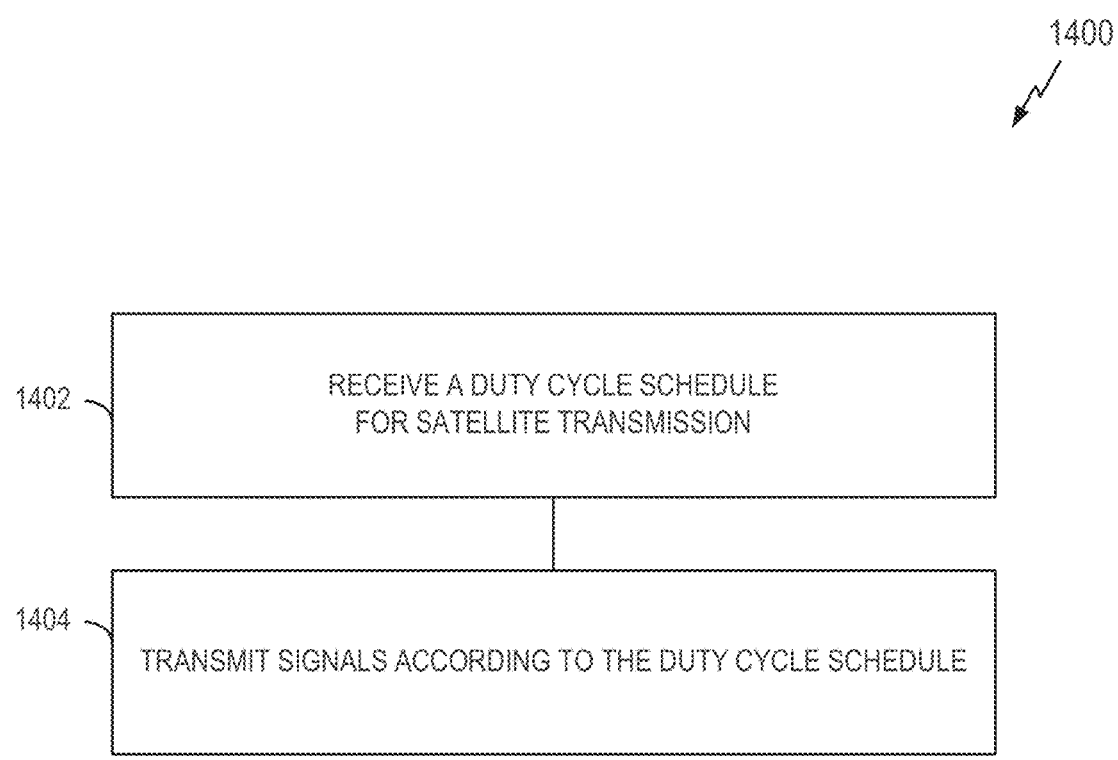
FIG. 14 is a flowchart illustrating an example of a power control process in accordance with some aspects of the disclosure.

The processing circuit 1310 may be a specialized processor, such as an application specific integrated circuit (ASIC) that serves as a means for (e.g., structure for) carrying out any one of the operations described in conjunction with FIGS. 9 and 14. The processing circuit 1310 serves as one example of a means for transmitting and/or a means for receiving. In some implementations, the processing circuit 1310 may provide, at least in part, the functionality of at least one of: the controller 122, 124, or 126 of FIG. 1, the SNP controller 250 of FIG. 2, the controller 340 of FIG. 3, the control processor 420 of FIG. 4, the controller 1008 of FIG. 10, the controller 1108 or 1116 of FIG. 11, or the controller 1208 or 1218 of FIG. 12.

According to at least one example of the apparatus 1300, the processing circuit 1310 may include one or more of a circuit/module for receiving a duty cycle schedule 1320, or a circuit/module for transmitting signals 1322.

The circuit/module for receiving a duty cycle schedule 1320 may include circuitry and/or programming (e.g., code for receiving a duty cycle schedule 1324 stored on the storage medium 1304) adapted to perform several functions relating to, for example, receiving a duty cycle schedule (e.g., an indication of the schedule) for satellite transmission from another apparatus. Initially, the circuit/module for receiving a duty cycle schedule 1320 obtains received information. For example, the circuit/module for receiving a duty cycle schedule 1320 may obtain this information from a component of the apparatus 1300 (e.g., the communication interface 1302 (e.g., a digital subsystem or an RF subsystem), the memory device 1308, or some other component) or directly from a device (e.g., a network entity or SNP) that generated the information. In some implementations, the circuit/module for receiving a duty cycle schedule 1320 identifies a memory location of a value in the memory device 1308 and invokes a read of that location. In some implementations, the circuit/module for receiving a duty cycle schedule 1320 processes (e.g., decodes) the received information to extract an indication of the duty cycle schedule. The circuit/module for receiving a duty cycle schedule 1320 outputs the received information (e.g., stores the indication in the memory device 1308 or sends the information to another component of the apparatus 1300). In some implementations, the communication interface 1302 includes the circuit/module for receiving a duty cycle schedule 1320 and/or the code for receiving a duty cycle schedule 1324.

The circuit/module for transmitting signals 1322 may include circuitry and/or programming (e.g., code for transmitting signals 1326 stored on the storage medium 1304) adapted to perform several functions relating to, for example, transmitting signals (e.g., including information) to another apparatus according to a duty cycle schedule. Initially, the circuit/module for transmitting signals 1322 obtains the information to be sent (e.g., from the memory device 1308, or some other component) and the duty cycle schedule (e.g., from the circuit/module for receiving a duty cycle schedule 1320). In some implementations, the information is sent based on the duty cycle schedule (e.g., the transmission is duty cycled). In some implementations, the information to be sent may include the duty cycle schedule (e.g., an indication of the schedule). The circuit/module for transmitting signals 1322 may format the information for transmission (e.g., in a message, according to a protocol, etc.). The circuit/module for transmitting signals 1322 then causes the information to be sent via a wireless communication medium (e.g., via satellite signaling) according to the duty cycle schedule. To this end, the circuit/module for transmitting signals 1322 may send the information to the communication interface 1302 (e.g., a digital subsystem or an RF subsystem) or some other component for transmission. In some implementations, the communication interface 1302 includes the circuit/module for transmitting signals 1322 and/or the code for transmitting signals 1326.

As mentioned above, programming stored by the storage medium 1304, when executed by the processing circuit 1310, causes the processing circuit 1310 to perform one or more of the various functions and/or process operations described herein. For example, the programming, when executed by the processing circuit 1310, may cause the processing circuit 1310 to perform the various functions, steps, and/or processes described herein with respect to FIGS. 9 and 14 in various implementations. As shown in FIG. 13, the storage medium 1304 may include one or more of the code for receiving a duty cycle schedule 1324, or the code for transmitting signals 1326.

Example Process

FIG. 14 illustrates a process 1400 for communication in accordance with some aspects of the disclosure. The process 1400 may take place within a processing circuit (e.g., the processing circuit 1310 of FIG. 13), which may be located in an SNP, a satellite, a UT, or some other suitable apparatus. In some implementations, the process 1400 may be performed by an SNP for at least one non-geosynchronous satellite. In some implementations, the process 1400 represents operations performed, at least in part, by at least one of: the controller 122, 124, or 126 of FIG. 1, the SNP controller 250 of FIG. 2, the controller 340 of FIG. 3, the control processor 420 of FIG. 4, the controller 1008 of FIG. 10, the controller 1108 or 1116 of FIG. 11, or the controller 1208 or 1218 of FIG. 12. Of course, in various aspects within the scope of the disclosure, the process 1400 may be implemented by any suitable apparatus capable of supporting communication operations.

At block 1402, an apparatus (e.g., an SNP, a satellite, or a UT) receives a duty cycle schedule for satellite transmission. For example, an SNP may receive the schedule from a network entity, a satellite may receive the schedule from an SNP, or a UT may receive the schedule from an SNP.

In some aspects, the duty cycle schedule specifies a percentage of temporal elements defined according to temporal boundaries to be used for transmission of data. The temporal elements may include, for example, subframes, portions of subframes, frames, super-frames, or timeslots.

In some aspects, the duty cycle schedule specifies a plurality of duty cycles to be used over a period of time corresponding to one orbit, a fraction of an orbit, or multiple orbits of at least one satellite. In some aspects, the duty cycle schedule specifies, for each beam transmitted by at least one satellite, a plurality of duty cycles to be used over a period of time corresponding to one orbit, a fraction of an orbit, or multiple orbits of the at least one satellite.

A duty cycle schedule may be based on various types of information. In some aspects, the duty cycle schedule is based on at least one limit for power radiated onto an area. In some aspects, the duty cycle schedule is based on location information for each of the at least one satellite. In some aspects, the duty cycle schedule is based on beam information for each of the at least one satellite. In some aspects, the duty cycle schedule is based on configuration information for each of the at least one satellite. In some aspects, the duty cycle schedule is based on status information for each of the at least one satellite.

At block 1404, the apparatus transmits signals according to the duty cycle schedule. In some aspects, the transmission of the signals involves transmitting the signals to at least one satellite. For example, an SNP may transmit the signals to at least one satellite according to the duty cycle schedule. As another example, a UT may transmit the signals to at least one satellite according to the duty cycle schedule. In some aspects, the transmission of the signals involves transmission of the signals by at least one satellite. For example, a satellite may transmit the signals to a UT or an SNP according to the duty cycle schedule.

Example Apparatus

Figure 15:
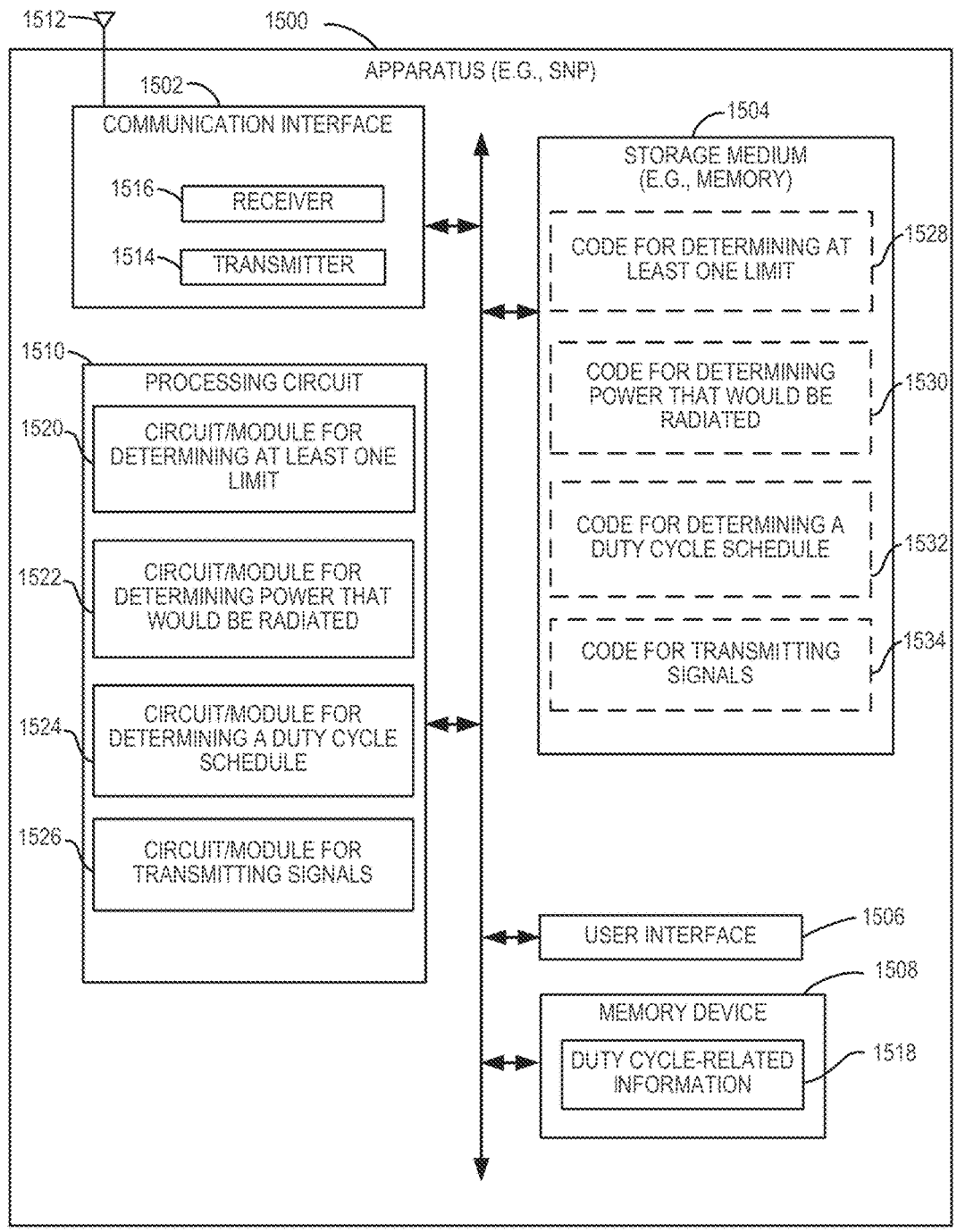
FIG. 15 is a block diagram illustrating an example hardware implementation for another apparatus (e.g., an electronic device) that can support power control in accordance with some aspects of the disclosure.

FIG. 15 illustrates a block diagram of an example hardware implementation of another apparatus 1500 configured to communicate according to one or more aspects of the disclosure. For example, the apparatus 1500 could embody or be implemented within an SNP, a network entity, a satellite, a UT, or some other type of device that supports satellite communication. In various implementations, the apparatus 1500 could embody or be implemented within a gateway, a ground station, a vehicular component, or any other electronic device having circuitry.

The apparatus 1500 includes a communication interface (e.g., at least one transceiver) 1502, a storage medium 1504, a user interface 1506, a memory device 1508 (e.g., storing duty cycle-related information 1518), and a processing circuit (e.g., at least one processor) 1510. In various implementations, the user interface 1506 may include one or more of: a keypad, a display, a speaker, a microphone, a touchscreen display, of some other circuitry for receiving an input from or sending an output to a user. The communication interface 1502 may be coupled to one or more antennas 1512, and may include a transmitter 1514 and a receiver 1516. In general, the components of FIG. 15 may be similar to corresponding components of the apparatus 1300 of FIG. 13.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 7, 8, 9, and 16. As used herein, the term "adapted" in relation to the processing circuit 1510 may refer to the processing circuit 1510 being one or more of configured, employed, implemented, and/or programmed to perform a particular process, function, operation and/or routine according to various features described herein.

The processing circuit 1510 may be a specialized processor, such as an application specific integrated circuit (ASIC) that serves as a means for (e.g., structure for) carrying out any one of the operations described in conjunction with FIGS. 7, 8, 9, and 16. The processing circuit 1510 serves as one example of a means for transmitting and/or a means for receiving. In various implementations, the processing circuit 1510 may provide, at least in part, the functionality of at least one of: the controller 122, 124, or 126 of FIG. 1, the SNP controller 250 of FIG. 2, the controller 340 of FIG. 3, the control processor 420 of FIG. 4, the controller 1008 of FIG. 10, the controller 1108 or 1116 of FIG. 11, or the controller 1208 or 1218 of FIG. 12.

According to at least one example of the apparatus 1500, the processing circuit 1510 may include one or more of a circuit/module for determining at least one limit 1520, a circuit/module for determining power that would be radiated 1522, a circuit/module for determining a duty cycle schedule 1524, or a circuit/module for transmitting signals 1526.

The circuit/module for determining at least one limit 1520 may include circuitry and/or programming (e.g., code for determining at least one limit 1528 stored on the storage medium 1504) adapted to perform several functions relating to, for example, determining, for a given area, at least one limit for power radiated onto the area. In some implementations, the circuit/module for determining at least one limit 1520 acquires this information (e.g., via the communication interface 1502, from the memory device 1508, or from some other component of the apparatus 1500). The circuit/module for determining at least one limit 1520 may then process the information to determine each limit (e.g., ITU limit) for a given area. The circuit/module for determining at least one limit 1520 generates an indication of this determination and sends the indication to a component of the apparatus 1500 (e.g., the circuit/module for determining a duty cycle 1524, the memory device 1508, or some other component).

The circuit/module for determining power that would be radiated 1522 may include circuitry and/or programming (e.g., code for determining power that would be radiated 1530 stored on the storage medium 1504) adapted to perform several functions relating to, for example, determining power that would be radiated onto an area by a plurality of satellites. In some implementations, the circuit/module for determining power that would be radiated 1522 acquires this information (e.g., via the communication interface 1502, from the memory device 1508, or from some other component of the apparatus 1500). In some implementations, the circuit/module for determining power that would be radiated 1522 calculates this information (e.g., as discussed above in conjunction with FIGS. 7 and 8). In either case, the circuit/module for determining power that would be radiated 1522 generates an indication of this determination (e.g., indicative of the amount of power that would be radiate onto an area by one or more satellites) and sends the indication to a component of the apparatus 1500 (e.g., the circuit/module for determining a duty cycle 1524, the memory device 1508, or some other component).

The circuit/module for determining a duty cycle schedule 1524 may include circuitry and/or programming (e.g., code for determining a duty cycle schedule 1532 stored on the storage medium 1504) adapted to perform several functions relating to, for example, determining a duty cycle schedule for satellite transmission. In some aspects, the determination of the duty cycle schedule may be based on at least one limit for at least one area (e.g., received from the circuit/module for determining at least one limit 1520). In some aspects, the determination of the duty cycle schedule may be based the determined power for at least one area (e.g., received from the circuit/module for determining power that would be radiated 1522). Initially, the circuit/module for determining a duty cycle schedule 1524 obtains information used in making the determination. For example, the circuit/module for determining a duty cycle schedule 1524 may obtain this information from a component of the apparatus 1500 (e.g., the communication interface 1502 (e.g., a digital subsystem or an RF subsystem), the memory device 1508, or some other component) or directly from a device (e.g., as discussed above) that generated the information. In some implementations, the circuit/module for determining a duty cycle schedule 1524 identifies a memory location of a value in the memory device 1508 and invokes a read of that location. The circuit/module for determining a duty cycle schedule 1524 processes the obtained information to calculate the duty cycle schedule (e.g., as discussed above in conjunction with FIGS. 7 and 8). The circuit/module for determining a duty cycle schedule 1524 then outputs an indication of the duty cycle schedule (e.g., stores the indication in the memory device 1508, sends the indication to the communication interface 1502, or sends the indication to another component of the apparatus 1500).

The circuit/module for transmitting signals 1526 may include circuitry and/or programming (e.g., code for transmitting signals 1534 stored on the storage medium 1504) adapted to perform several functions relating to, for example, transmitting signals (e.g., including information) to another apparatus according to a duty cycle schedule. Initially, the circuit/module for transmitting signals 1526 obtains the information to be sent (e.g., from the memory device 1508, or some other component). In some implementations, the information is sent based on the duty cycle schedule (e.g., the transmission is duty cycled). In some implementations, the information to be sent may include the duty cycle schedule (e.g., an indication of the schedule). The circuit/module for transmitting signals 1526 may format the information for transmission (e.g., in a message, according to a protocol, etc.). The circuit/module for transmitting signals 1526 then causes the information to be sent via a communication medium (e.g., via satellite signaling or a network connection) according to the duty cycle schedule. To this end, the circuit/module for transmitting signals 1526 may send the information to the communication interface 1502 (e.g., a digital subsystem or an RF subsystem) or some other component for transmission. In some implementations, the communication interface 1502 includes the circuit/module for transmitting signals 1526 and/or the code for transmitting signals 1534.

As mentioned above, programming stored by the storage medium 1504, when executed by the processing circuit 1510, causes the processing circuit 1510 to perform one or more of the various functions and/or process operations described herein. For example, the programming, when executed by the processing circuit 1510, may cause the processing circuit 1510 to perform the various functions, steps, and/or processes described herein with respect to FIGS. 6 and 16 in various implementations. As shown in FIG. 15, the storage medium 1504 may include one or more of the code for determining at least one limit 1528, the code for determining power that would be radiated 1530, the code for determining a duty cycle schedule 1532, or the code for transmitting signals 1534.

Example Process

Figure 16:
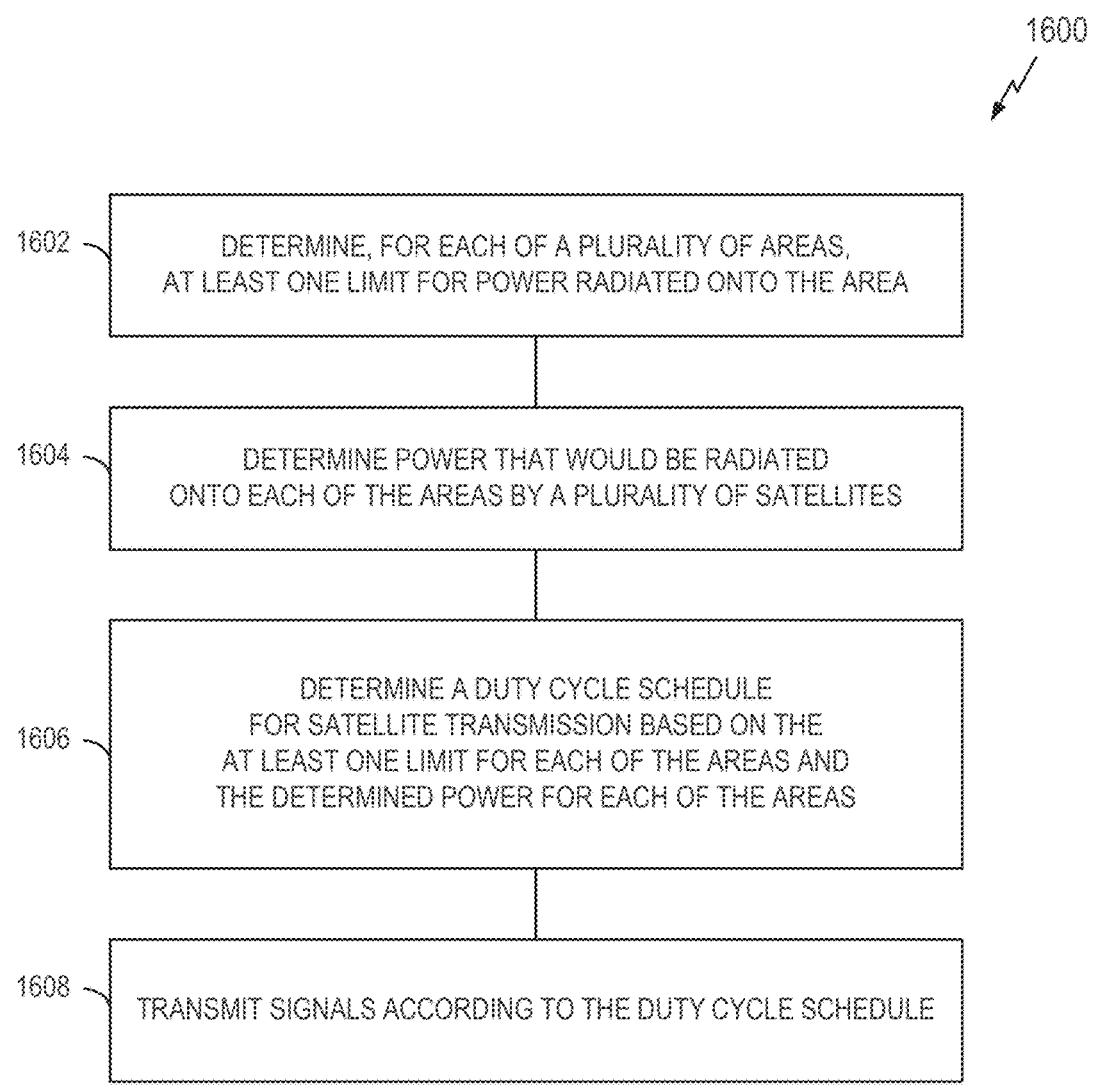
FIG. 16 is a flowchart illustrating an example of a duty cycle schedule process in accordance with some aspects of the disclosure.

FIG. 16 illustrates a process 1600 for communication in accordance with some aspects of the disclosure. The process 1600 may take place, at least in part, within a processing circuit (e.g., the processing circuit 1510 of FIG. 15), which may be located in an SNP, a network entity, a satellite, a UT, or some other suitable apparatus. In some implementations, the process 1600 may be performed by an SNP for at least one non-geosynchronous satellite. In some implementations, the process 1600 represents operations performed, at least in part, by at least one of: the controller 122, 124, or 126 of FIG. 1, the SNP controller 250 of FIG. 2, the controller 340 of FIG. 3, the control processor 420 of FIG. 4, the controller 1008 of FIG. 10, the controller 1108 or 1116 of FIG. 11, or the controller 1208 or 1218 of FIG. 12. Of course, in various aspects within the scope of the disclosure, the process 1600 may be implemented by any suitable apparatus capable of supporting communication operations.

At block 1602, an apparatus (e.g., an SNP, a network entity, a satellite, or a UT) determines, for each of a plurality of areas, at least one limit for power radiated onto the area. In some aspects, the at least one limit may be at least one International Telecommunication Union (ITU) power limit.

At block 1604, the apparatus determines power that would be radiated onto each of the areas by a plurality of satellites. For example, the apparatus may calculate a CDF as discussed herein.

In some aspects, the determination of power may be based on information regarding at least one configuration of each of the satellites. In some aspects, the at least one configuration includes at least one of: satellite ephemeris information, or default transmit power.

In some aspects, the determination of power is based on information regarding at least one status of each of the satellites. In some aspects, the at least one status includes at least one of: offered load, satellite health, satellite failure, beam status, beam failure, current satellite position, satellite position drift, operational drift of at least one satellite component, operational variances of at least one satellite component, satellite beam orientation errors, amplifier gain variation over a set of amplifiers, antenna gain variation over a set of antennas, or directionality variation over a set of antennas.

At block 1606, the apparatus determines a duty cycle schedule for satellite transmission based on the at least one limit for each of the areas determined at block 1602 and the power for each of the areas determined at block 1604. In some aspects, the duty cycle schedule specifies a percentage of temporal elements defined according to temporal boundaries to be used for transmission of data. In some aspects, the temporal elements include: subframes, portions of subframes, frames, super-frames, or timeslots.

In some aspects, the duty cycle schedule specifies a plurality of duty cycles to be used over a period of time corresponding to one orbit, a fraction of an orbit, or multiple orbits of the at least one satellite. In some aspects, the duty cycle schedule specifies, for each beam transmitted by the at least one satellite, a plurality of duty cycles to be used over a period of time corresponding to one orbit, a fraction of an orbit, or multiple orbits of the at least one satellite.

At block 1608, the apparatus transmits signals according to the duty cycle schedule. In some implementations, an SNP transmits the signals to at least one of the satellites according to the duty cycle schedule. In some implementations, one of the satellites transmits the signals according to the duty cycle schedule. In some implementations, a UT transmits the signals to at least one of the satellites according to the duty cycle schedule.

In some aspects, the transmission of the signals involves transmitting the signals to at least one of the satellites. For example, an SNP may transmit the signals to at least one satellite according to the duty cycle schedule. As another example, a UT may transmit the signals to at least one satellite according to the duty cycle schedule. In some aspects, the transmission of the signals includes transmission of the signals by at least one of the satellites. For example, a satellite may transmit the signals to a UT or an SNP according to the duty cycle schedule. In some aspects, the transmission of the signals includes transmission of the signals by a network entity (e.g., a network entity sends a message including an indication of the duty cycle schedule to an SNP via a network connection).

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

Accordingly, one aspect of the disclosure can include a computer readable media embodying a method for time or frequency synchronization in non-geosynchronous satellite communication systems. Accordingly, the disclosure is not limited to illustrated examples and any means for performing the functionality described herein are included in aspects of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
receiving a duty cycle schedule for satellite transmission, wherein the duty cycle schedule indicates a first percentage of time during which a satellite is allowed to transmit onto an area and a second percentage of time during which the satellite is not allowed to transmit onto the area, wherein the duty cycle schedule is based on at least one limit for power radiated onto the area, wherein the at least one limit comprises a maximum equivalent power flux density allowed to be radiated onto the Earth; and
transmitting signals by controlling, according to the duty cycle schedule, when a radio frequency component of the satellite operates.

2. The method of claim 1, wherein the duty cycle schedule specifies a percentage of temporal elements defined according to temporal boundaries to be used for transmission of data.

3. The method of claim 2, wherein the temporal elements comprise: subframes, portions of subframes, frames, superframes, or timeslots.

4. The method of claim 1, wherein the duty cycle schedule specifies a plurality of duty cycles to be used over a period of time corresponding to one orbit, a fraction of an orbit, or multiple orbits of the satellite.

5. The method of claim 1, wherein the duty cycle schedule specifies, for each beam transmitted by at least one satellite, a plurality of duty cycles to be used over a period of time corresponding to one orbit, a fraction of an orbit, or multiple orbits of the at least one satellite.

6. The method of claim 1, wherein the duty cycle schedule is based on location information for each of at least one satellite.

7. The method of claim 1, wherein the duty cycle schedule is based on beam information for each of at least one satellite.

8. The method of claim 1, wherein the duty cycle schedule is based on configuration information for each of at least one satellite.

9. The method of claim 1, wherein the duty cycle schedule is based on status information for each of at least one satellite.

10. The method of claim 1, wherein the duty cycle schedule is based on default transmit power for each of at least one satellite.

11. The method of claim 1, wherein the duty cycle schedule is based on offered load for each of at least one satellite.

12. The method of claim 1, wherein the transmission of the signals comprises transmitting the signals to the satellite.

13. The method of claim 12, wherein a satellite network portal transmits the signals.

14. The method of claim 12, wherein a user terminal transmits the signals.

15. The method of claim 1, wherein the transmission of the signals comprises transmission of the signals by the satellite.

16. The method of claim 1, wherein the duty cycle schedule sets an average transmission power for the satellite to be less than a default transmission power.

17. An apparatus for communication comprising:
a memory; and
a processor coupled to the memory,
the processor and the memory configured to:
receive a duty cycle schedule for satellite transmission, wherein the duty cycle schedule indicates a first percentage of time during which a satellite is allowed to transmit onto an area and a second percentage of time during which the satellite is not allowed to transmit onto the area, wherein the duty cycle schedule is based on at least one limit for power radiated onto the area, wherein the at least one limit comprises a maximum equivalent power flux density allowed to be radiated onto the Earth; and transmit signals by controlling, according to the duty cycle schedule, when a radio frequency component of the satellite operates.

18. The apparatus of claim 17, wherein the duty cycle schedule specifies a plurality of duty cycles to be used over a period of time corresponding to one orbit, a fraction of an orbit, or multiple orbits of the satellite.

19. The apparatus of claim 17, wherein the duty cycle schedule specifies, for each beam transmitted by at least one satellite, a plurality of duty cycles to be used over a period of time corresponding to one orbit, a fraction of an orbit, or multiple orbits of the at least one satellite.

20. The apparatus of claim 17, wherein the duty cycle schedule is based on at least one of: location information for each of at least one satellite, beam information for each of at least one satellite, or default transmit power for each of at least one satellite.

21. The apparatus of claim 17, wherein the duty cycle schedule is based on at least one of: configuration information for each of at least one satellite, or status information for each of at least one satellite.

22. An apparatus for communication comprising:
means for receiving a duty cycle schedule for satellite transmission, wherein the duty cycle schedule indicates a first percentage of time during which a satellite is allowed to transmit onto an area and a second percentage of time during which the satellite is not allowed to transmit onto the area, wherein the duty cycle schedule is based on at least one limit for power radiated onto the area, wherein the at least one limit comprises a maximum equivalent power flux density allowed to be radiated onto the Earth; and
means for transmitting signals by controlling, according to the duty cycle schedule when a radio frequency component of the satellite operates.

23. The apparatus of claim 22, wherein the duty cycle schedule specifies a plurality of duty cycles to be used over a period of time corresponding to one orbit, a fraction of an orbit, or multiple orbits of the satellite.

24. The apparatus of claim 22, wherein the duty cycle schedule specifies, for each beam transmitted by at least one satellite, a plurality of duty cycles to be used over a period of time corresponding to one orbit, a fraction of an orbit, or multiple orbits of the at least one satellite.

25. A non-transitory computer-readable medium storing computer-executable code, including code to:
receive a duty cycle schedule for satellite transmission, wherein the duty cycle schedule indicates a first percentage of time during which a satellite is allowed to transmit onto an area and a second percentage of time during which the satellite is not allowed to transmit onto the area, wherein the duty cycle schedule is based on at least one limit for power radiated onto the area, wherein the at least one limit comprises a maximum equivalent power flux density allowed to be radiated onto the Earth; and
transmit signals by controlling, according to the duty cycle schedule, when a radio frequency component of the satellite operates.

26. A method of communication, comprising:
determining, for each of a plurality of areas, at least one limit for power radiated onto the area, wherein the at least one limit comprises a maximum equivalent power flux density allowed to be radiated onto the Earth;
determining power that would be radiated onto each of the areas by a plurality of satellites;
determining a duty cycle schedule for satellite transmission based on the at least one limit for each of the areas and the determined power for each of the areas, wherein the duty cycle schedule indicates, for each area, a first percentage of time during which a particular satellite of the plurality of satellites is allowed to transmit onto the area and a second percentage of time during which the particular satellite is not allowed to transmit onto the area; and
transmitting signals to control, according to the duty cycle schedule, when a radio frequency component of the particular satellite operates.

27. The method of claim 26, wherein the at least one limit comprises at least one regulatory power limit.

28. The method of claim 26, wherein the determination of power is based on information regarding at least one configuration of each of the satellites.

29. The method of claim 28, wherein the at least one configuration comprises at least one of: satellite ephemeris information, or default transmit power.

30. The method of claim 26, wherein the determination of power is based on information regarding at least one status of each of the satellites.

31. The method of claim 30, wherein the at least one status comprises at least one of: satellite health, satellite failure, beam status, or beam failure.

32. The method of claim 30, wherein the at least one status comprises at least one of: current satellite position or satellite position drift.

33. The method of claim 30, wherein the at least one status comprises at least one of: operational drift of at least one satellite component, operational variances of at least one satellite component, or satellite beam orientation errors.

34. The method of claim 30, wherein the at least one status comprises at least one of: amplifier gain variation over a set of amplifiers, antenna gain variation over a set of antennas, or directionality variation over a set of antennas.

35. The method of claim 26, wherein the duty cycle schedule specifies a percentage of temporal elements defined according to temporal boundaries to be used for transmission of data.

36. The method of claim 35, wherein the temporal elements comprise: subframes, portions of subframes, frames, super-frames, or timeslots.

37. The method of claim 26, wherein the duty cycle schedule specifies a plurality of duty cycles to be used over a period of time corresponding to orbits of the satellites.

38. The method of claim 26, wherein the duty cycle schedule specifies, for each beam transmitted by the satellites, a plurality of duty cycles to be used over a period of time corresponding to orbits of the satellites.

39. The method of claim 26, wherein the transmission of the signals comprises transmitting the signals to at least one of the satellites.

40. The method of claim 39, wherein a satellite network portal transmits the signals.

41. The method of claim 39, wherein a user terminal transmits the signals.

42. The method of claim 26, wherein the transmission of the signals comprises transmission of the signals by at least one of the satellites.

43. The method of claim 26, wherein the determination of the duty cycle schedule comprises selecting a duty cycle schedule that sets an average transmission power for the satellite to be less than a default transmission power.

44. An apparatus for communication comprising:
a memory; and
a processor coupled to the memory,
the processor and the memory configured to:
determine, for each of a plurality of areas, at least one limit for power radiated onto the area, wherein the at least one limit comprises a maximum equivalent power flux density allowed to be radiated onto the Earth;
determine power that would be radiated onto each of the areas by a plurality of satellites;
determine a duty cycle schedule for satellite transmission based on the at least one limit for each of the areas and the determined power for each of the areas, wherein the duty cycle schedule indicates, for each area, a first percentage of time during which a particular satellite of the plurality of satellites is allowed to transmit onto the area and a second percentage of time during which the particular satellite is not allowed to transmit onto the area; and
transmit signals to control, according to the duty cycle schedule, when a radio frequency component of the particular satellite operates.

45. The apparatus of claim 44, wherein the determination of power is based on information regarding at least one configuration of each of the satellites and/or at least one status of each of the satellites.

46. The apparatus of claim 45, wherein the at least one configuration comprises at least one of: satellite ephemeris information, or default transmit power.

47. The apparatus of claim 45, wherein the at least one status comprises at least one of: satellite health, satellite failure, beam status, beam failure, current satellite position, satellite position drift, operational drift of at least one satellite component, operational variances of at least one satellite component, satellite beam orientation errors, amplifier gain variation over a set of amplifiers, antenna gain variation over a set of antennas, or directionality variation over a set of antennas.

48. The apparatus of claim 44, wherein the duty cycle schedule specifies a plurality of duty cycles to be used over a period of time corresponding to orbits of the satellites.

49. The apparatus of claim 44, wherein the duty cycle schedule specifies, for each beam transmitted by the satellites, a plurality of duty cycles to be used over a period of time corresponding to orbits of the satellites.

50. An apparatus for communication comprising:
means for determining, for each of a plurality of areas, at least one limit for power radiated onto the area, wherein the at least one limit comprises a maximum equivalent power flux density allowed to be radiated onto the Earth;
means for determining power that would be radiated onto each of the areas by a plurality of satellites;
means for determining a duty cycle schedule for satellite transmission based on the at least one limit for each of the areas and the determined power for each of the areas, wherein the duty cycle schedule indicates, for each area, a first percentage of time during which a particular satellite of the plurality of satellites is allowed to transmit onto the area and a second percentage of time during which the particular satellite is not allowed to transmit onto the area; and
means for transmitting signals to control, according to the duty cycle schedule, when a radio frequency component of the particular satellite operates.

51. The apparatus of claim 50, wherein the duty cycle schedule specifies a plurality of duty cycles to be used over a period of time corresponding to orbits of the satellites.

52. The apparatus of claim 50, wherein the duty cycle schedule specifies, for each beam transmitted by the satellites, a plurality of duty cycles to be used over a period of time corresponding to orbits of the satellites.

53. A non-transitory computer-readable medium storing computer-executable code, including code to:
determine, for each of a plurality of areas, at least one limit for power radiated onto the area, wherein the at least one limit comprises a maximum equivalent power flux density allowed to be radiated onto the Earth;
determine power that would be radiated onto each of the areas by a plurality of satellites;
determine a duty cycle schedule for satellite transmission based on the at least one limit for each of the areas and the determined power for each of the areas, wherein the duty cycle schedule indicates, for each area, a first percentage of time during which a particular satellite of the plurality of satellites is allowed to transmit onto the area and a second percentage of time during which the particular satellite is not allowed to transmit onto the area; and
transmit signals to control, according to the duty cycle schedule, when a radio frequency component of the particular satellite operates.

* * * * *